United States Patent
Wang

(10) Patent No.: US 10,380,509 B2
(45) Date of Patent: Aug. 13, 2019

(54) METHOD AND SYSTEM FOR PROVIDING AN INDIVIDUALIZED ETA IN THE TRANSPORTATION INDUSTRY

(71) Applicant: Kevin Sunlin Wang, Flushing, NY (US)

(72) Inventor: Kevin Sunlin Wang, Flushing, NY (US)

(73) Assignee: OPERR Technologies, Inc., Flushing, NY (US)

( * ) Notice: Subject to any disclaimer, the term of this patent is extended or adjusted under 35 U.S.C. 154(b) by 0 days.

(21) Appl. No.: 16/113,823

(22) Filed: Aug. 27, 2018

(65) Prior Publication Data

US 2018/0364062 A1 Dec. 20, 2018

Related U.S. Application Data

(63) Continuation-in-part of application No. 15/239,783, filed on Aug. 17, 2016.

(Continued)

(51) Int. Cl.
| | |
|---|---|
| *G06Q 10/06* | (2012.01) |
| *G01C 21/36* | (2006.01) |
| *G01C 21/34* | (2006.01) |

(52) U.S. Cl.
CPC ....... *G06Q 10/063* (2013.01); *G01C 21/3484* (2013.01); *G01C 21/3492* (2013.01); *G01C 21/3691* (2013.01); *G06Q 10/063114* (2013.01)

(58) Field of Classification Search
CPC ......... G06Q 10/063; G06Q 10/063114; G01C 21/3484; G01C 21/3691; G01C 21/3492
See application file for complete search history.

(56) References Cited

U.S. PATENT DOCUMENTS

| | | | |
|---|---|---|---|
| 6,144,917 A | 11/2000 | Walters | |
| 6,317,686 B1 * | 11/2001 | Ran | G01C 21/3691 701/117 |

(Continued)

FOREIGN PATENT DOCUMENTS

| | | |
|---|---|---|
| EP | 2 065 867 | 3/2016 |
| WO | WO2016162781 | 10/2016 |

OTHER PUBLICATIONS

Intini, P.; Berloco, N.; Colonna, P.; Ranieri, V., The Impact of Route Familiarity on Drivers' Speeds, Trajectories and risk perception, Statens väg-och transportforskningsinstitut, 2016, 12 pages, 17th International Conference Road Safety on Five Continents (RS5C 2016), Rio de Janeiro, Brazil, May 17-19, 2016.

*Primary Examiner* — Stephanie Z Delich
(74) *Attorney, Agent, or Firm* — Ugweches, Wang & Associates, LLP

(57) ABSTRACT

Disclosed is a system and method of improving a calculation and display of an individualized estimated time of arrival (ETA). Using at least one computing device, driver-related data, including real-time and historic data, associated with a driver may be collected and stored in memory. The computing device may also be used to perform analysis on the driving data and ETA-related data to determine the individualized ETA based at least in part on a set of individualized parameters. The computing device may also be used to display to the driver and/or user the individualized ETA and a corresponding level of familiarity of the driver with one or more segments of a route of the driver.

20 Claims, 10 Drawing Sheets

Related U.S. Application Data

(60) Provisional application No. 62/325,602, filed on Apr. 21, 2016, provisional application No. 62/290,778, filed on Feb. 3, 2016.

(56) References Cited

U.S. PATENT DOCUMENTS

| | | | |
|---|---|---|---|
| 6,321,158 B1 * | 11/2001 | DeLorme | G01C 21/26 340/995.16 |
| 6,810,321 B1 | 10/2004 | Cook | |
| 9,037,405 B2 | 5/2015 | Gourlay | |
| 9,360,333 B2 | 6/2016 | Tuukkanen | |
| 9,723,447 B2 | 8/2017 | Lubeck | |
| 2010/0217519 A1 * | 8/2010 | Englerth | G01C 21/3492 701/465 |
| 2015/0241235 A1 | 8/2015 | Lobato Fregoso | |
| 2017/0314950 A1 | 11/2017 | Tian | |

\* cited by examiner

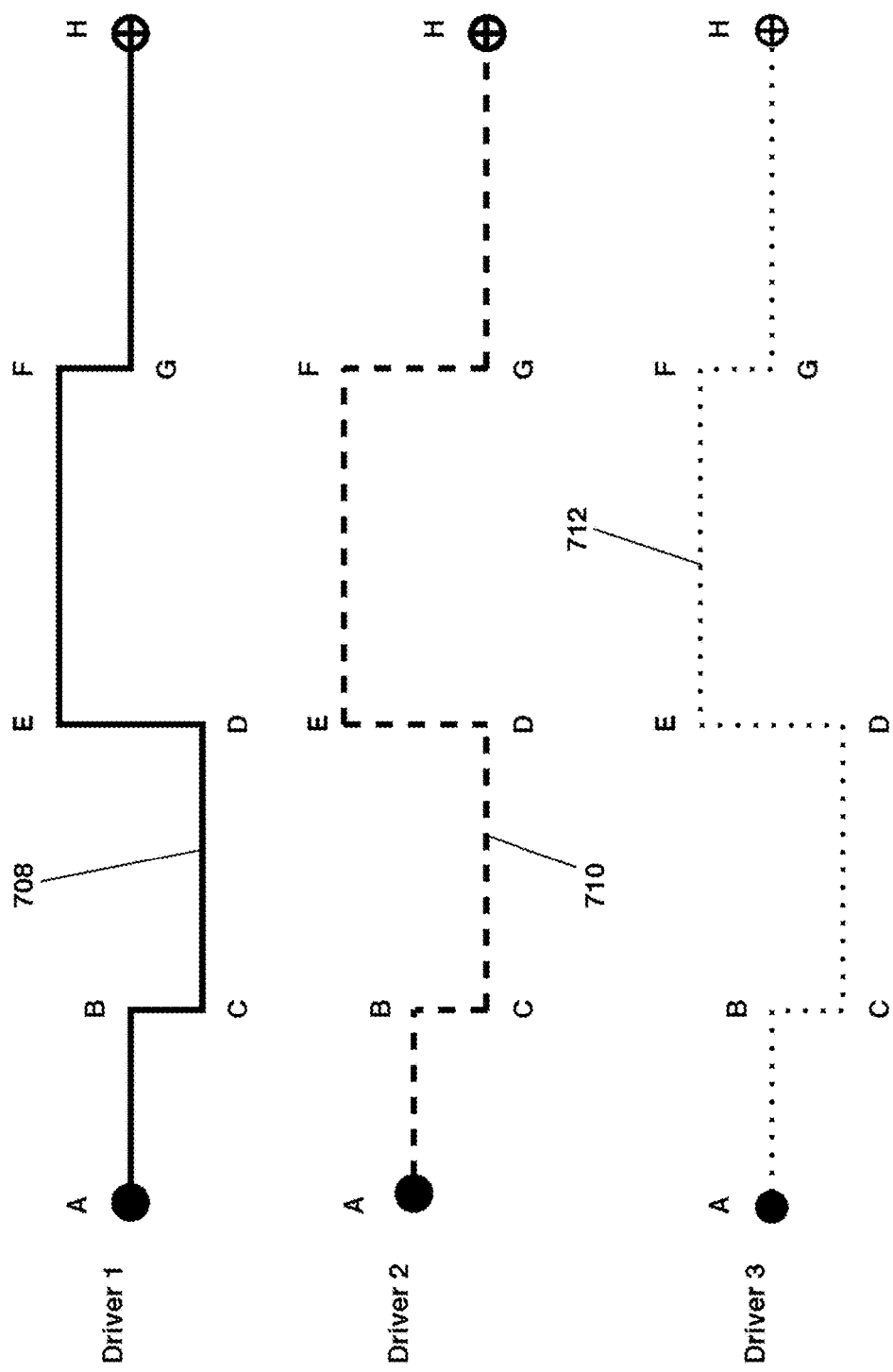

METHOD AND SYSTEM FOR PROVIDING AN INDIVIDUALIZED ETA IN THE TRANSPORTATION INDUSTRY

CROSS-REFERENCE TO RELATED APPLICATIONS

The present application is a continuation-in-part application of U.S. Non-Provisional patent application Ser. No. 15/239,783 ("the '783 application"), filed on Aug. 17, 2016, which claims the benefit of U.S. Provisional Patent Application No. 62/325,602, filed on Apr. 21, 2016, and U.S. Provisional Patent Application No. 62/290,778, filed Feb. 3, 2016, and hereby incorporates all of these preceding applications by reference herein in their entireties.

FIELD OF THE INVENTION

The present disclosure relates generally to the field of transportation services, and more particularly, to a system and method for automatically calculating and communicating an individualized estimated time of arrival (ETA) of a user, such as a driver, at a particular destination based on historical and/or real time driving data associated with the driver, such as driving habits, driving tendencies, level of familiarity (LOF) with a given route, average speed of other drivers on the given route, driving preferences, vehicle conditions, time frame, speed limit, etc.

BACKGROUND OF THE INVENTION

An ETA is usually an important piece of information that a user, such as a driver or a passenger of a vehicle, may use to plan a trip. Also, updating ETA at various points during the trip allows the user to update travel plans along the way. ETA related services may be provided by various map, location, or traffic applications, which may use different types of data and information to determine ETA. However, applications known in the art provide the same ETA information to numerous users, and thus may be inaccurate for a particular user or driver. That is, previous ETAs are not individualized in that they do not consider the particular driver's driving habits with respect to speed as compared to the other drivers on the route, and other driver-specific characteristics. Also, known ETA calculations are based on the particular driver's current speed, but fail to consider the conditions that are or may be impacting driving speeds on additional route segments of the current route. Additionally, known ETA calculation systems fail to consider individual characteristics or traits of the particular driver, such as his/her LOF with the route segments. Also, the known systems do not provide a display indicating both the ETA and LOF for each driver, both for the route from the driver's current location to the customer and/or from the customer's pick-up location to the customer's intended destination.

In other words, in prior systems, the ETA information is estimated regardless of user identity or user-specific traits or characteristics, which can result in inaccuracies in the predicted ETA. Thus, there is a technical problem with prior methods of calculating ETA in that such methods do not account for the behavior of individual drivers under different circumstances. In that regard, there is a need to determine ETA based on individualized user-related data associated with the user in order to provide a more precise and individualized ETA to the user. The present disclosure provides a technical solution to this technical problem. There is also a need in the art for an improved method and system for providing optimal or improved ETA calculations using the modern telecommunication means and satellite tracking systems. As discussed herein, the method and system according to the inventive disclosure overcomes many of the limitations of the prior art.

SUMMARY OF THE INVENTION

The following summary is not intended to identify or point to essential features or limit the scope of the subject matter claimed herein. The inventive disclosure relates generally to transportation services and, more specifically, to a system and method for automatically calculating and communicating an individualized estimated time of arrival (ETA) of a user, such as a driver, at a particular destination based on historical driving data associated with the driver, such as driving habits, driving tendencies, level of familiarity (LOF) with a given route, average speed of other drivers on the given route, driving preferences, vehicle conditions, time frame, speed limit, etc. The inventive disclosure establishes a computer-implemented system and method with the following objectives:

To automatically provide an updated location and/or an individualized or personalized ETA of a driver assigned to a service request of a customer;

To monitor a driver's behavior, such as speed or average speed, along one or more route segments, and calculate an ETA of the driver at a designated location based in part on the driver's past speed or average speed along the one or more route segments or along other route segments;

To calculate or determine an ETA of a driver at a designated location based on historical data associated with the driver, a present speed of the driver along a route segment, and an average speed of a plurality of other drivers along the route segment or a speed limit along the route segment;

To calculate or determine an ETA of a driver at a designated location based on the driver's LOF with one or more route segments of a route from a driver's location to a destination (e.g., a pick-up location);

To calculate or determine an updated ETA of a driver;

To provide an individualized ETA utilizing a difference between the average speed of a driver along one route segment and the average speed of the other drivers along the same route segment to predict speed of the driver along the additional route segments to the destination in order to determine an individualized ETA for the driver at the destination;

To predict a speed of the driver along the additional route segments to the destination by identifying time-varying geographic location data for the driver and by determining characteristics of the driver in accordance with predetermined rules;

To base an ETA calculation or determination on characteristics comprising a level of familiarity of the driver with segments of the route, a geometry of the route segments, whether the route is a double-back of a route recently completed by the driver, a type of vehicle driven by the driver, bottlenecks along the route, an age range of the driver, a gender of the driver, road and weather conditions along the route, speed limits along the route, a time frame of the driver travelling along the route, a retrieved portion of historic data associated with the driver, etc.;

To provide a display indicating both the ETA and LOF for each driver, both for the route from the driver's current location to the customer and/or from the customer's pick-up location to the customer's intended destination in order to provide the user, driver or customer with more transparency into the driver's ETA and LOF with the desired route or route segments;

To automatically and periodically update a personalized ETA calculated for a driver;

To utilize artificial intelligence (AI) to predict or otherwise anticipate the details of a customer's potential service request based on customer related details stored in the system's database to provide improved ETA;

To satisfy various restrictive user and/or driver requirements such as times, quantity, designated locations, and allotted resources while minimizing the average transportation arrival waiting time; and To vary a frequency with which time-varying geographic location information provided by a location identifier of a driver computing device is tracked and stored in the database for use in updating an individualized ETA of a driver, and vary the frequency based on a speed of a driver's vehicle in accordance with a plurality of predetermined rules.

In an exemplary embodiment of the inventive disclosure, provided is a computer-implemented method for determining and providing an individualized estimated time for arrival (ETA) comprising establishing a current route of a driver to a destination location, the current route being based on a set of possible routes between a current geographic location of the driver and the destination location, identifying (i) a total distance between the current geographic location of the driver and the destination location, (ii) an average speed of the driver along a first route segment of the current route, (iii) an average speed of a first set of one or more other drivers along the first route segment of the current route, and (iv) an average speed of a second set of one or more other drivers along one or more additional route segments of the current route, determining a difference between the average speed of the driver along the first route segment and the average speed of the first set of one or more other drivers along the first route segment, computing a predicted speed of the driver along the one or more additional route segments of the current route based on the difference and the average speed of the second set, and calculating an individualized ETA of the driver at the destination location based at least on the predicted speed of the driver along the one or more additional route segments of the current route.

In another embodiment of the inventive disclosure, the predicted speed of the driver along the one or more additional route segments is further determined by identifying time-varying geographic location data of the driver, the time-varying geographic location data being updated in real-time, and determining one or more characteristics in accordance with one or more predetermined rules, where the one or more characteristics comprises a level of familiarity of the driver with one or more segments of the current route. In certain embodiments, the one or more characteristics may additionally or alternatively comprise a geometry of the one or more segments, whether the current route is a doubleback of a route recently completed by the driver, a type of vehicle driven by the driver, one or more bottlenecks along the one or more segments of the route, an age range of the driver, a gender of the driver, road and weather conditions along the one or more segments, one or more speed limits along the one or more route segments, a time frame of the driver travelling along the one or more segments, and a retrieved portion of the historic data associated with the driver.

In yet another exemplary embodiment of the inventive disclosure, provided is a computer-implemented method for determining and providing an individualized estimated time for arrival (ETA) comprising identifying a preferred route of a driver to a destination location, the preferred route being based on a set of possible routes between a current geographic location of the driver and the destination location, setting the preferred route as a current route of the driver, identifying a total distance between the current geographic location of the driver and the destination location, determining (i) an average speed of the driver along a first route segment of the current route, wherein the average speed is based on one of: an actual average speed of the driver or a historical average speed of the driver along the first route segment, (ii) an average speed of a first set of one or more other drivers along the first route segment of the current route, and (iii) an average speed of a second set of one or more other drivers along one or more additional route segments of the current route, computing the individualized ETA for the driver by calculating a predicted speed of the driver along the one or more additional route segments of the current route, wherein the predicted speed of the driver is computed at least by (a) identifying time-varying geographic location data of the driver, and (b) determining one or more characteristics in accordance with one or more predetermined rules, wherein the one or more characteristics comprise determining: a difference in average speed between the average speed of the driver along the first route segment and the average speed of the second set of one or more other drivers along the one or more additional route segments; and a level of familiarity (LOF) of the driver with one or more segments of the current route; and displaying an indicator on a display screen of a user, the indicator representing the individualized ETA.

In still a further exemplary embodiment of the inventive disclosure, provided is a computer-implemented method for determining and providing an individualized estimated time for arrival (ETA), the method comprising establishing a current route of a driver to a destination location, the current route being based on a set of possible routes between a current geographic location of the driver and the destination location, determining an ETA of the driver at the destination location, wherein the ETA determination is individualized for the driver based at least on a level of familiarity (LOF) of the driver with the current route, the current route comprising one or more segments, displaying, on a display screen of a user, an interactive electronic interface including an indicator representing the LOF of the driver with the current route, wherein the LOF is represented as at least one of: (a) a direct LOF or (b) an indirect LOF, and displaying, on the interface, a roadmap of the current route and one or more linear depictions of one or more alternative routes from the current geographic location of the driver to the destination location, wherein the one or more linear depictions of the one or more alternative routes are displayed with indicators identifying a disparity between the current route and the one or more alternative routes.

Other objects, features, and characteristics of the inventive disclosure, as well as the methods of operation and functions of the related structural elements, and the combination of parts and economies of development and manufacture, will become more apparent upon consideration of the detailed description below with reference to the accompanying drawings, all of which form a part of this specification.

BRIEF DESCRIPTION OF THE DRAWINGS

A further understanding of the inventive disclosure can be obtained by reference to preferred embodiments set forth in the illustrations of the accompanying drawings. Although the illustrated preferred embodiment is merely exemplary of methods, structures and compositions for carrying out the inventive disclosure, both the organization and method of the inventive disclosure, in general, together with further objectives and advantages thereof, may be more easily understood by reference to the drawings in conjunction with the following description. The drawings are not intended to limit the scope of this inventive disclosure, which is set forth with particularity in the claims as appended or as subsequently amended, but merely to clarify and exemplify the inventive disclosure.

Accordingly, a more complete appreciation of the inventive disclosure and many of the attendant aspects thereof may be readily obtained as the same becomes better understood by reference to the following detailed description when considered in conjunction with the accompanying drawings, where:

FIG. 7B illustrates another exemplary format for depicting route familiarity for multiple drivers on a display device, further depicting different formats for route familiarity based on the different number of times a route has been travelled by particular drivers, in accordance with exemplary embodiments of the inventive disclosure;

DETAILED DESCRIPTION OF THE INVENTION

Figure 1:
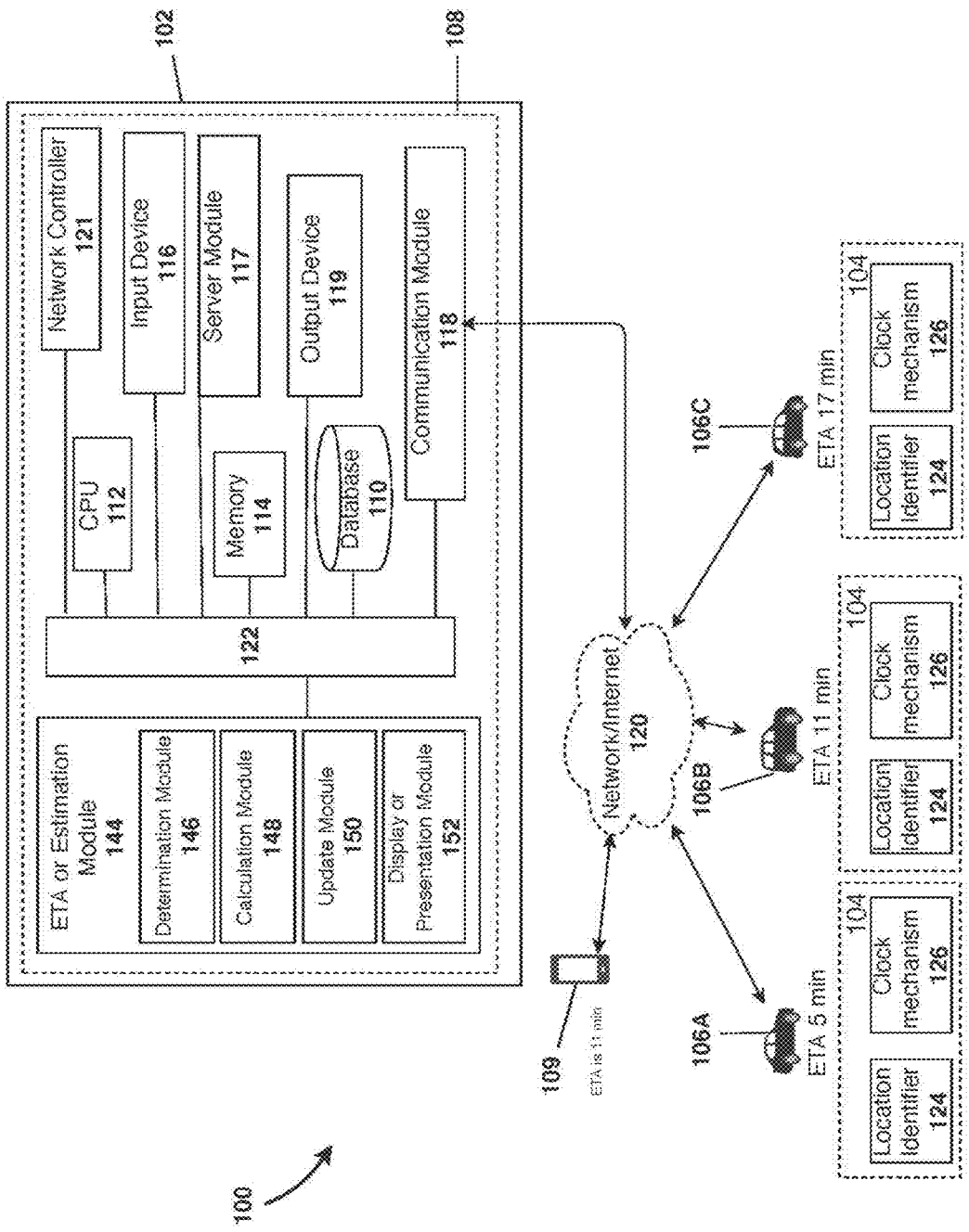
FIG. 1 is a schematic diagram illustrating an automated transportation network operatively associated with a customer communicating via a smartphone, non-smartphone cellphone, or other device, and a computing system configured for tracking driver information through an on-line computer network, in accordance with exemplary embodiments of the inventive disclosure.

The present disclosure is not intended to be limited to the specific terminology so selected, and it is to be understood that each specific element includes all technical equivalents which operate in a similar manner. As required, a detailed illustrative embodiment of the inventive disclosure is disclosed herein. However, techniques, methods, systems, compositions and operating structures in accordance with the inventive disclosure may be embodied in a wide variety of sizes, shapes, forms and modes, some of which may be quite different from those in the disclosed embodiment. Consequently, the specific structural, functional and step-by-step details disclosed herein are merely representative, yet in that regard, are deemed to afford the best embodiment for purposes of disclosure and to provide a basis for the claims herein which define the scope of the inventive disclosure.

In the following detailed description, specific embodiments that may be practiced are shown by way of illustration and explanation. The embodiments are described in sufficient detail to enable those skilled in the art to practice the embodiments, and it is to be understood that logical, mechanical, and other changes may be made without departing from the scope of the embodiments. The following detailed description is therefore not to be taken in a limiting sense. In describing exemplary embodiments of the inventive disclosure illustrated in the drawings, specific terminology is employed for the sake of clarity, however, the present disclosure is not intended to be limited to the specific terminology so selected. For example, elements and/or features of different exemplary embodiments may be combined with each other and/or substituted for each other within the scope of this disclosure and appended claims. In the description of the figures below, it will be understood that the details described above may be combined with, or may be used in place of, similar attributes described below, and that the figures are used only to illustrate particular exemplary embodiments of the inventive disclosure.

In certain embodiments of the inventive disclosure, a level of familiarity (LOF) indicator may be provided that visually conveys a familiarity of a driver with a route of a service request, represented at least through a percentage, a percent interval, a tiered listing, or any other depiction. It is also contemplated that the LOF may be provided as a set of indicators, for example, conveying a familiarity of the driver with each respective segment of the route. The LOF indicator may be represented as, for example, "PFR", which may be the driver's familiarity with the route. For example, "PFR10%" would illustrate an LOF of a preferred driver with the route in the customer's service request and "10%" would indicate that his/her LOF is ten percent (10%). Thus, the LOF indicator reflects a driver's degree of familiarity with the requested route. An LOF preference allows a customer to preset a certain percentage for how familiar a driver should be with a requested route.

This indicator is generated by connecting requested route information with a driver's service records stored in a database. For a transport request, this information may include the driver's LOF with the route indicated in the service request. For delivery service, this may be information such as the drivers experience or LOF with that particular route. Regardless of the service request type, the indicator may be adjusted to display information relevant to the situation. For a driver, this may be a useful indicator in evaluating where he/she has picked up many customers, or where he/she picked up only a few customers. This indicator may be used by drivers to evaluate where they have the most experience or may be the most valuable, or it may be used by a customer in selecting a best matching driver based on the experience the driver may have with the service request.

The LOF indicator, which connects with data and information to show familiarity with the service request route, may affect the customer's price proposal or selection of a driver, as the driver having extensive experience with the route may be of more value to the customer. Further, the indicator may help the driver in accepting or rejecting a price, as he/she is able to know what the driver's value is based on experience, whether with the route or by location. If it is vital for a customer to have the service request carried out by a driver who is less likely to get lost along the requested route, a customer can prioritize drivers who are most familiar with the route between the requested pick-up and drop-off locations, where familiarity of each such driver can be shown as a percentage. Most importantly, however, the LOF, as discussed in detail in certain embodiments of the inventive disclosure, affects an estimated time for arrival (ETA) of the driver resulting from predicted changes in speed of the driver based on a degree of familiarity of the driver with the route. A driver's LOF is contextualized in two ways, by "direct" or "indirect" familiarity, and each type is distinct. Direct familiarity is a calculation of how familiar the driver is with a certain route, as in the route from the pick-up location to the drop-off location—all done in one trip. Indirect familiarity, by contrast, is a calculation of how familiar a driver is with the route between the pick-up and drop-off location, but this familiarity may be through piecemeal experience with the route.

For example, two drivers may have one hundred percent (100%) familiarity with a route. The first driver may have provided service of this same route for a customer previously, from the same pick-up location to the same drop-off location. This is a direct familiarity. Further, in addition to indicating one hundred percent (100%) LOF of the driver with the route, the indicator may also inform that it is a direct familiarity. The second driver may also have a one hundred percent (100%) familiarity—however, one part of the route he/she provided for a different customer in the past, and another part of the route was also included as part of the route in another service request. Even though the driver has traversed the length of this entire route, it was not from the same pick-up location to the same drop-off location. The familiarity the second driver has with the route is therefore indirect. The LOF with the requested route, whether direct or indirect, will be calculated by comparing the requested route with the routes of service requests previously completed by the same driver by tracking how common all or any parts of the requested route are to the routes of previously completed trips or service requests. The driver's familiarity with the requested route especially matters at times when any part of the requested route lies within an area known to have weak or no global positioning system (GPS) signal, or when the service request takes place after dark, making it harder to follow navigation directions.

In certain embodiments, the LOF may be determined based on a comparison of historical GPS location data of the driver with GPS location data for the first route segment and the additional route segments of the current route. The system then determines a matching relationship between the historical GPS location data of the driver and the GPS location data for the first route segment and the additional route segments of the current route of the driver. Preferably, the matching relationship is defined as a percentage of the GPS location data for the first route segment and the additional route segments that match directly or indirectly with the historical GPS location data for the particular driver. The system may then identify a recency, frequency, and/or consecutiveness of travel along each of the first route segment and the additional route segments by the driver. As used herein, the recency may be defined as time having passed since the last travel along the route (i.e., a degree of separation between travelling along one or more segments of the current route and a most recent instance of travelling along the one or more segments). The frequency may be defined as a number of times travelling along the route (or one or more segments) within a defined period of time. The consecutiveness may be defined as a number of, for example, days in a row travelling along the route (i.e., a degree of separation between one or more instances of travelling along the one or more segments of the current route).

While customizable sets of indicators are briefly described below, their descriptions and applications are more fully described in the '783 application, and U.S. patent application Ser. No. 15/715,012, entitled "System and Method for Customizable Pre-Scheduled Dispatching for Transportation Services", filed Sep. 25, 2017, the disclosures of which are incorporated by reference herein in their entireties. Such sets of indicators may include identification of drivers, identification status of customers, identification of the availability of drivers, LOF, ETA, etc.

Other indicators may include displaying information regarding a price initiated by a driver in a case where a customer sends a service request without a quoted price (which may be either negotiable or non-negotiable) connecting historical data and geolocation data to reflect information regarding zone information based on the total number of service requests completed by a driver within the geographic zone in which a customer indicates the pick-up location of the service request, connecting historical data and geolocation data to reflect information regarding zone information based on the total number of requests completed by a driver within the geographic zone in which a customer indicated the drop-off location in the service request, conveying the LOF of a driver with the route of the service request, represented at least through percentage or any other depiction such as tiers, based on how many times a customer and a driver have been matched and have completed a transaction together, connecting the location information of the driver with location information of the customer's pick-up location to display the time within which a driver can pick-up the customer, an ETA, etc., based on the estimated travel time (ETT) from the customer's pick-up location to the customer's drop-off location indicated in a service request, connecting geolocation data to reflect at least the customer's pick-up and drop-off locations indicated in the service request, and conveying information about total number of service requests requested and completed by a customer.

Yet other indicators may include identifying one or more or any combination of geographic zones based on one or more or any combination of search parameters preset by the driver, based on the prior indicator to further display the number of potential available drivers compared to the number of potential available customers, to help streamline the display of the price proposals a customer initiates, where numbers regarding pricing information are connected and displayed, to provide details about a customer's proposed price that comes as a response to a driver's proposed price, where numbers regarding pricing information are connected and displayed by this set of indicators, to connect historical data regarding a customer's service request history and geolocation data to identify a customer by how many service requests he/she has requested and completed based on pick-up location geographic zones, to identify a customer by how many service requests he/she has requested and completed based on drop-off location geographic zones, where geolocation data and historical service request data are connected, to connect historical service request data to display the number of times a driver and a customer have been matched with each other and completed a transaction together, to identify the estimated travel time to complete a service request for a driver, and to connect geolocation data of a driver and the geolocation data of driver's preset return location after carrying out a service request, if the driver preset a return location.

In certain other embodiments, a customer may also preset preferences. This customization allows a customer to feel comfortable and satisfied with the quality of services he/she expects to receive. Some examples of preferences for transport service include but are not limited to whether a route includes tolls or no tolls, time (e.g., take shortest route), a driver's language skills or capabilities, a driver's experience, a driver's driving skills, a driver's familiarity with certain routes or areas, or any combination thereof. Depending on the type of service, a customer may be given a display that shows which drivers are near him/her and those drivers' ETAs, along with historical data that shows each driver's familiarity with the route a customer has indicated in the service request. Taking many different factors and preferences from a customer into account in selecting a driver to fulfill a service request is important in providing excellent, tailored service. For example, a customer may preset in the settings to choose a best matching driver among drivers who have at least a certain percent route LOF indication (e.g., fifty percent (50%)). Any driver who does not meet this condition may be precluded from being a possible driver for a customer for that specific request, and any driver from fifty to one hundred percent (50-100%) may be included.

Empirical studies demonstrate that differences in driving behavior are often due to a user's LOF with the road, route or area, and confirm that route familiarity is influential on driver behavior (e.g., increasing attention/inattention while driving, etc.) and speed choice (e.g., speed increases with the repetition of travel on the same route if on consecutive days). The speed increasing tendency may be different according to the risk inclination of the different drivers and according to the different road geometry characteristics. The process of trajectory selection at, for example, curves in the road along a route segment, is also influenced by route familiarity (i.e., the radius of curvature of the trajectories selected at curves increases with the repetition of travel on the same route, which shows curve-cutting and encroachments), which also affects speed.

Furthermore, an influential feature in drivers' behavior can be identified in their familiarity with a route, determined by their habits driving on it. In particular, there is a clear increasing tendency over the first four consecutive days with respect to speeds. On the fifth and the sixth days, which may be identified as being more distant in time than the others, the speeds remain roughly constant in the long term, even if driving tests are interrupted for some days. In the same days of testing, they can maintain higher speeds than the speeds measured on the first travel. That is, driving performance measures such as speed can be affected by increased road familiarity. In the familiarization stage, in which the driver is learning the information about the road layout, changes in driving performances (e.g., speeds) can take place relative to the first time of travel on the route. Studies have shown that speed choice is influenced by increased familiarity with a given route, and speeds selected by drivers progressively increase in the early four consecutive days of testing. The increase in speed is greater in sections in which road geometric characteristics are less demanding.

Referring to FIG. 1, automated transportation system 100 is provided, which may include various modules such as, for example, ETA or estimation module 144, communication module 118, and server or dispatching module 117. As shown, system 100 may be utilized with cell phone or smart phone 109 or other device capable of communication with computing system 102 via, for example, network 120. In such embodiments, ETA or estimation module 144 may additionally or alternatively include determination module 146, calculation module 148, update module 150 and presentation module 152. It is contemplated that the functions of these components may be combined in one or more components or performed by other components of equivalent functionality.

In certain embodiments, communication module 118 may include one or more modules, such as, for example, a messaging module, a voice module, a speech or voice recognition module, an IVR module, etc. Also, server or dispatch module 117 may include one or more of a create trip/service request module, an update/change request module, a cancel request module, a check status module, etc. System 100 may utilize various other phone systems described herein and improve upon systems and methods known in the art for providing transportation information, updates, or changes for customers, such as ETA information. System 100 provides a novel way to supply updated transportation information or changes to transportation service requests using, for example, bi-directional digital, phone or text communication(s) with minimal or no live agent involvement.

Computing system 102 may include a combination of hardware and software operable via, for example, an application running on server 108 and/or one or more remote computing devices 104 associated with each driver 106A, 106B, 106C. Remote computing device 104 may be a smartphone, tablet computer, laptop computer, or an in-vehicle navigation system, etc., and may connect to computing system 102, generally with one or more connections through a communication network 120 (e.g., wireless wide-area network (WAN), the Internet, etc.). In-vehicle navigation systems integrating or otherwise using GPS or other similar services around the world may include built-in (or in-dash) navigation systems, stand-alone navigation systems (i.e., those manufactured by Garmin®, TomTom®, Furuno®, Magellan®, etc.), or smartphones using mobile navigation applications. Computing system 102 includes server 108, which preferably comprises one or more hardware devices or software, including database 110, stored on a non-transitory computer readable storage medium such as a hard disk, central processing unit (CPU) 112, memory 114, input device(s) 116 (e.g., a keyboard, mouse, scanner, microphone), communication module 118, one or more output devices 119, and network controller 121. Preferably, server 108 comprises one or more processors (e.g., central processing unit) 112 and one or more server-readable program storage media. The program storage media can be non-transitory and tangible in nature and may embody a program of instructions executable by processors 112 to perform the various functions described herein using system components. The hardware devices within server 108 may all be connected by bus 122. Additionally, for convenience, aesthetics, etc., hardware devices described herein may be housed either inside or outside of server 108 or computing system 102 and connected via a wired or wireless link. Preferably, CPU 112 may be any type of logic processing unit, such as one or more digital signal processors, application-specific integrated circuits, etc., which may be connected through any known system bus structures, including a memory bus with memory controller, a peripheral bus, and a local bus to implement system functionalities.

Communication module 118 may include any approach for communicating data over one or more networks or to one or more peripheral or remote devices. Communication module 118 can include, but is not limited to, circuitry and control systems for providing wireless connections, wired connections, cellular connections, data port connections, Bluetooth® connections, or any combination thereof, and the means may include devices enabled to communicate using such communication approaches. One of ordinary skill in the art would appreciate that there are numerous approaches for communication that may be utilized in accordance with the inventive disclosure.

In certain embodiments, customer phone 109 may include a smartphone, a non-smartphone cellphone (e.g., a cellphone without internet access), or a remote computing device (e.g., a smartphone or other internet-enabled cell phone, an in-vehicle navigation system, or another means of access such as a laptop computer, desktop computer, tablet, smartwatch, etc.) capable of interacting with computing system 102. Phone 109 may be a smartphone utilized to communicate directly online with computing system 102. Remote driver communication devices 104 preferably each have a location identifier 124, and clock mechanism 126. In certain embodiments, driver computing devices 104 may additionally include a camera, a microphone, a touch screen display, etc. Optionally, various functions of driver communication devices 104 can include phone call functionality, a microphone, GPS tracking for geolocation mapping (i.e., latitude and longitude coordinates), and/or a camera device, etc.

In certain embodiments, the current location of driver computing devices 104 can be determined by location identifier 124, which can determine the location in various ways. Location identifier 124 may be used to identify a current location of the driver and alert the driver when he/she is within a customizable predetermined distance of one or more locations. Location identifier 124 may be connected, through driver computing device 104, to a data processing apparatus such as a microprocessor, using either a wired or a wireless medium. In one example, location identifier 124 can be instantiated through processing received GPS data from location-based or geo-aware resources of driver computing device 104. In addition, location identifier 124 can also receive GPS data from other applications or programs that operate on driver computing device 104. For example, driver computing device 104 may communicate with one or more other applications using one or more application program interfaces (APIs). The application can then use the location information to cause a user interface component to configure a user interface framework based on the location information.

Driver computing device 104, through location identifier 124, can send location-based system (LBS) data (e.g., indicative of the location status of the drivers) to computing system 102 automatically and/or periodically for storage in and dynamic updating of database 110. In certain embodiments, when the correct conditions are met, computing system 102 can query data in database 110 and cross reference it with a stored location of the user and the present time in its query of database 110 to identify relevant data for generating and transmitting a notification (e.g., containing ETA information) to a customer. System 100 can tailor the notification in accordance with the user's optionally preset preferences and may periodically query database 110 in this manner. Alternatively, computing system 102 may access database 110 using specific APIs, by subscription, or by being pushed to retrieve or distribute/display this data as it is made available. Driver computing device 104 may automatically and periodically connect to computing system 102 to relay data such as time, date, location etc., receive a notification, and convey that notification to the user. All such information/data is preferably stored in database 110.

Continuing with FIG. 1, system 100 may be configured to calculate traffic parameters such as current traffic speed on a given road based on time and location data of various drivers 106A, 106B, 106C received from location identifier 124 and clock mechanism 126. As further discussed below, a customer may receive updates from system 100 on the location, speed, and/or ETA of a driver assigned to his/her service request and/or other information based on inputs received from the customer. System 100 may determine a driver's speed from a speed sensor in driver computing device 104 and/or from location data and time data received from location identifier 124 and clock mechanism 126. Remote driver computing devices 104 may include, for example, a GPS navigation device, mobile phones, personal digital assistants (PDA), personal navigation devices (PND), car PC, mobile computers, or any other suitable device able to include, receive, and manipulate and/or operate software. The plurality of remote driver computing devices 104 with connectivity capability may be in communication with computing system 102, for example, via communication network 120 (e.g., the Internet, a cellular network, wireless network, or any other mobile communication or internet means). The connection between driver computing devices 104 and computing system 102 may be made by any known connection protocol, for example, Transmission Control Protocol (TCP), User Datagram Protocol (UDP), Hypertext Transfer Protocol (HTTP), Wireless Application Protocol (WAP) or any other suitable protocol. In certain embodiments, drivers 106A, 106B, 106C may periodically and automatically send to computing system 102, for example, by location identifiers 124 and clock mechanisms 126 of remote driver computing devices 104, their momentary location and/or speed details. Additionally, drivers 106A, 106B, 106C may also send to computing system 102 information on different events, such as traffic information, alerts, messages, etc.

In certain embodiments, remote driver computing devices 104 may avoid sending redundant information to computing system 102. For example, driver computing devices 104 may receive and store parameters such as an average speed along a road, known traffic signs, posted or publicly available speed limits traffic lights and/or other information, all of which may be stored in database 110. In certain embodiments, driver computing devices 104 may also avoid sending information already known and/or data which may not add to the known information, allowing for more efficient information communication. Driver computing devices 104 may automatically and periodically send momentary location and/or speed data of a driver to computing system 102, for example, by software provided with driver computing devices 104. The software may be provided and/or installed, for example, upon registration by a driver as a member of a traffic mapping service. Additional information may be transmitted to computing system 102 by remote driver computing device 104 manually by the driver, by phone call to a service center, or by any other suitable communication.

Driver data may include driver historical data, driver profiles, such as personal data including a photo of the driver and years of his/her driving experience, gender, country of origin, language abilities, driving history or record, etc. Database 110 may also include data related to a driver's vehicle, such as make and model, color, seating capacity and accessibility, insurance status, and/or pictures of the driver's vehicle. Additional information in the driver's profile may include, for example, limitations related to zip codes, time, location, and price, as well as service data and records. Database 110 may further include administrative data comprising prices and rates, system data, such as contact and FAQ information, registration details regarding customers and drivers, billing information, and/or other information related to administering the service application. Database 110 may also include customer data such as a customers' profile, including personal data, customer's preferences, service requests data, and records. Database 110 preferably syncs dynamically, so that whenever there are changes or updates in data blocks, server 108 and database 110 dynamically update the data in database 110 accordingly to reflect the latest changes. At least one backup database may be provided to backup primary database 110 in case of data loss in primary database 110. Additional databases may be utilized.

It will be appreciated that various systems or methods may be utilized in accordance with the inventive disclosure by a variety of users and/or computer systems, including but not limited to: vehicles, driverless vehicles, websites, in-vehicle systems, GPS units, and/or other electronic systems. It will be appreciated that driver computing device 104 may run applications described herein as one or more apps. Such driver computing devices 104 may include smartphones, tablets, laptops, desktop computers, in-dash vehicle navigation systems, etc. It will be appreciated that exemplary embodiments of the inventive disclosure are not limited to the specific embodiments discussed herein, and may encompass other systems or services which may process, utilize, and/or display data. Online mapping systems, GPS, or mobile communications device manufacturers, wireless service providers, mobile application creators and developers, etc., may greatly benefit from the information collected and disseminated.

An application running on a computing device can utilize resources of the computing device, which may include a data processing apparatus (e.g., a microprocessor), memory, location identifier 124, a wireless connection, and a display. The display may be the means through which notifications are shown to a user (e.g., driver), or a notification may potentially be relayed through other media such as the audio system, etc. An application may additionally be incorporated with in-vehicle computer or navigation systems to enable the system to be fully integrated with a vehicle. This integration is not limited to in-vehicle computer or navigation systems and may also be integrated in the vehicle by an original equipment manufacturer or third-party aftermarket equipment that may be mounted within a vehicle. Integration may include utilization of vehicle equipment, such as a speedometer, accelerometer, cameras, GPS, and any other applicable equipment, etc. Utilization of this vehicle equipment may be used to obtain comprehensive real-time and historical activity information about the vehicle such as direction, speed, orientation and acceleration, etc., in order to issue applicable notifications to the users, including with respect to ETA.

In certain embodiments, driver computing device 104 may include a mobile data terminal in communication with server 108 through wireless network 120, and may use a GPS locating device to determine a current location. It will be understood by those skilled in the art that the GPS may alternatively be a global navigation satellite system (GNSS), long range navigation (LORAN), or any other commercially available service, or combination of services, that provides global position information. Such services include, but may not be limited to, the United States' Global Positioning System (GPS), Russia's GLONASS, China's BeiDou Navigation Satellite System (BDS), the European Union's Galileo system, India's NAVIC system, Japan's QZSS system, etc. Driver computing device 104 may be a smartphone, and may comprise a processor, an input device, a location identification device, a wireless communication device, a user interface, and a battery. The processor may coordinate between the different systems and control calculations. The customer may use an input device (e.g., other than a standard landline telephone or cellular phone) to dial phone numbers, establish a communication with the network 120 to enter or request information about a service request. The input device may be any suitable type of user input device, such as a keyboard, a pointing device (e.g., a mouse), a touch sensitive display, a microphone, a voice recognition system, or any combination of such devices. A user interface may convey information to a user, and may be a speaker, a liquid crystal display (LCD), a cathode ray tube, a plasma discharge display, or any combination of such devices or any other audible or visual means capable of conveying information to the user.

Location identifiers 124 of driver computing devices 104 are preferably used to determine the driver's current location and may include a GPS receiver that cooperates with a publicly available GPS device to determine the driver's current position. Location identifier 124 may include a server-assisted GPS system where a wireless server carries some of the functions of a traditional GPS receiver, and may enhance position information by applying differential GPS corrections. Location identifier 124 may use cellular network triangulation to determine the current position and may include any device capable of determining current position information. The communication device may be used to communicate with a wireless network, and may be a modem, a cellular phone, a personal communication device, or any other communication device capable of accessing a wireless network. Server 108 may contain processor 112, database 110, and communication device or module 118. Processor 112 coordinates between the different systems and may perform various calculations. Database 110 stores location information of available drivers as well as information about customers requesting service. Database 110 may store GPS differential corrections for enhancing the GPS position information, customer related data, and driver related data. Database 110 may also store digital map information to translate customer GPS positions into street locations to be sent to the drivers. As discussed herein, other types of GPS or LBS may be utilized depending on the country in which a driver is driving.

In certain embodiments, computing system 102 may use a set of databases or data storage mediums to provide and maintain a dispatch service application in order to dispatch a compatible driver based on a customer's preferences and needs, such as ETA, LOF, etc. Database 110 may contain several data categories or groupings. Sections of database 110 may be independent or synchronized in order to retrieve information from both sections at the same time. Such data can include rules and procedures data, administrative data, customer data, driver data, group data comprising base data, company's data, or group of individuals' data, and other types of data such as data relating to user types. All historical information may be categorized and stored in and retrieved from database 110. Historical data can be tracked in part by assigning a tracking number, service ID number or trip ID corresponding to each service request to help computing system 102 refer back to the service request. Information categorized with this identification may include the type of service request, who requested and carried it out, where it took place (e.g., by zip code, borough, county, city, state, etc.), what the route was, the cost of the service request, when and how payment for the service took place, etc. All information regarding a customer's or driver's preferences or limitations, pricing, and other customizable information can be stored within database 110.

Additional data may be input (manually or automatically) into database 110, including, but not limited to, locations where customers traveled to, speed limits along routes along which drivers travel, other transaction data and details, historical data, or any combination thereof. This data may also include information relating to indicators and the display thereof. By way of example, the data may include the service requests that all customers or drivers have completed in a certain area, such as one or more streets, zip codes, town, city, borough, county, state, or any other region defining feature, or how many times a customer and a driver have been paired by computing system 102. Customer information may also include any information associated with the customer, including, for example, the customer's transportation needs, one or more customer preferences, a customer favorites list, a customer blacklist, customer contact information, customer billing information, the customer's home address, the customer's place of business, the customer's preferences, historical information such as information about previous locations for which a customer requested service, recommended points of interest, etc. Computing system 102 may be configured to retrieve driver profile information from database 110 in response to a telephonic communication (e.g., by phone call) from a customer. Driver profile information can include driver service limitations, driver history and/or service history, etc. It will be appreciated that database 110 can store customer information and driver profile information for a plurality of customers and drivers, as well as any other data desired.

The system, to determine the ETA, may be configured to cause server 108 to establish a current route of the driver to the pick-up location, the current route being based on a set of possible routes between the current geographic location of the driver and the pick-up location (i.e., the destination). A total distance between the location data of the driver at the point in time and the pick-up location may be determined, and an average speed of each of the driver and of other drivers along the first route segment of the current route. The system may then also determine an average speed of the other drivers along additional route segments of the current route all the way to the destination. Having this information, the system may determine a difference in average speed between the average speed of the driver along the first route segment, the average speed of the other drivers along the first route segment, and the average speed of the other drivers along one or more additional route segments to determine a predicted speed of the driver along the additional route segments of the current route.

The application may be further configured to cause server 108 to establish the individualized ETA for the driver by calculating a predicted speed of the driver for one or more segments of the route in accordance with one or more predetermined rules, the predicted speed of the driver being computed at least by identifying the time-varying geographic location data of the driver, the location data being updated in real-time, by determining one or more characteristics (and/or assigning weights to) each of the one or more characteristics in accordance with the one or more predetermined rules. Preferably, such characteristics may comprise an LOF of the driver with the one or more segments of the route, a geometry of the one or more segments, whether the route is a return of a route preceding the return and a level of similarity of the return and the route preceding the return, a vehicle type driven by the driver, one or more bottlenecks along the one or more segments of the route, an age group of the driver, a gender of the driver, a time frame the driver is travelling along the one or more route segments, one or more speed limits along the one or more route segments, a retrieved portion of the historic data associated with the driver, etc.

For example, the geometry of the one or more segments may be determined in terms of a total interval or a tier of degrees of road curvature, where a segment of the one or more segments is assigned a coefficient in accordance with one or more predetermined rules to represent the degree of road curvature of the segment or segments. Similarly, the type of vehicle driven by the driver, the age range of the driver, and the gender of the driver may each be assigned a coefficient, where the coefficient is in accordance with one or more predetermined rules and depends on a tier size of the vehicle, a tier age of the driver and a specific gender of the driver, respectively. Additionally, identification of the current route as being the double-back of the route recently completed may be assigned a coefficient in accordance with the one or more predetermined rules and factored into the LOF calculation. In certain additional embodiments, the system may calculate the ETA by further identifying a plurality of possible routes between the current geographic location of the driver and the destination location, determining the current route of the driver, determining whether one or more toll payment areas are located along the one or more segments of the current route, determining a toll payment delay for the one or more toll payment areas, and in response to receiving an indication of automatic toll payment, adjusting the toll payment delay for the one or more toll payment areas based on at least one of: a predetermined adjusted toll payment delay, a predetermined amount of time, or a current actual delay time at an automatic toll payment area.

The application may further be configured to cause server 108 to establish one or more route segments of the current route of the driver to the destination, and, based on driver historical data stored in the database, determine an estimated average speed of the driver along previous route segments that overlap the route segments of the current route. Having this previous estimated average speed, the application may further determine an adjustment to the average speed of the driver along the current route based on the estimated average speed, and then modify the estimate of the ETA of the driver at the destination based on the adjustment.

In certain embodiments, the application may further be configured to cause server 108 to collect and store the speed limits corresponding to route segments of the current route. Based on the speed limits for the route segments, the system may calculate an average speed difference between a speed of the driver along the route segments and the speed limits along the route segments, and modify the ETA of the driver at the destination based on the average speed difference. In another embodiment, the system may monitor a speed of a vehicle driven by the driver, and vary a frequency with which the time-varying geographic location information generated by location identifier 124 of driver computing device 104 is received and stored in the database. The frequency may be varied based on the speed of the vehicle driven by the driver and in accordance with a plurality of predetermined rules. For example, the time-varying geographic location information generated by location identifier 124 of driver computing device 104 may be received less frequently if the speed of the vehicle driven by the driver exceeds a predetermined threshold. Alternatively, the time-varying geographic location information generated by location identifier 124 of driver computing device 124 may be received more frequently if the speed of the vehicle driven by the driver reduces below a predetermined threshold.

By way of example, ETA or estimation module 144 may also be provided which may include one or more components for calculating a final ETA to at least one destination location based, at least in part, on multiple ETAs provided by one or more devices and/or services for one or more route segments. In such an embodiment, estimation module 144 may include determination module 146, calculation module 148, update module 150 and presentation module 152. It is contemplated that the functions of these components may be combined in one or more components or performed by other components of equivalent functionality.

Determination module 146 may determine a real-time position of at least one user to cause a presentation of time-based information for at least one route comprising a plurality of route segments. In another embodiment, determination module 146 may process the received ETA from plurality of devices or services. Then, determination module 146 may determine, at least in part, a variation in the timing information that impacts the total ETA to a destination location. In a further embodiment, determination module 146 may determine at least one time-requirement for at least one route segment. Then, determination module 146 may determine any changes that affect subsequent route segments.

In another embodiment, calculation module 148 may cause, at least in part, a calculation of the ETA by at least one device associated with at least one vehicle, at least one other device associated with at least one user, or a combination thereof for at least one route segment. In another embodiment, calculation module 148 may cause, at least in part, a recalculation of ETA based, at least in part, on real-time traffic information, public transport schedule information, real-time speed information, real-time obstruction information, or a combination thereof. In a further embodiment, calculation module 148 may calculate the total ETA based on the individual ETA.

In another embodiment, update module 150 may cause an updating of the total ETA based, at least in part, on the updated individual ETA. A calculation of the updated ETA upon receiving notification on the changes to the individual ETA, according to one embodiment, may be performed by estimation module 144 and may be implemented in, for instance, processor 112 and memory 114.

Estimation module 144 may also receive data indicating at least one change to the at least one individual ETA. In one embodiment, the data indicating the change includes substantially real-time sensor data respectively collected by and/or private to the plurality of devices. For example, a user may be talking while driving, where such activity reduces the driving speed. The computing device associated with a vehicle (e.g., embedded vehicular navigation application, etc.) may not observe such activity, but the computing device associated with the user (e.g., a mobile device) may sense such activity and notify the system to generate a new ETA and then share this information. Such sharing of ETA between one or more devices generates the most accurate results.

Estimation module 144 may also cause, at least in part, a transmission of the at least one change to the plurality of devices for initiating a calculation of at least one updated individual ETA by the plurality of devices or services. In one scenario, estimation module 144 may trigger recalculation of an updated ETA. For example, if a driver stops for coffee this might lead to a delay, then estimation module 144 may recalculate the ETA for the remaining travel portion of the route to compensate for the delay. The recalculation can occur when the user is drinking the coffee, and the mobile device and the vehicle may coordinate and recalculate.

In certain embodiments, computing system 102 may also be configured to communicate with driver computing device 104 of a driver (e.g., 106A/B/C) via communication module 118 and network/internet 120. For example, computing system 102 may automatically send an inquiry to driver computing device 104 prompting the driver to input a status of his/her present service request (e.g., 'in progress', 'complete', etc.). The driver may also be prompted to provide an estimate of how long it will be before he will start the customer's service request. The driver may be waiting on a customer/passenger at a location and may be aware of a development computing system 102 is unaware of, such as construction, a sudden road closure, a passenger running late or requesting changes to the service request while the driver is driving him/her, etc.). Driver computing device 104 may be provided with an electronic interface or mechanical pushbutton which he/she can use to alert computing system 102, through network 120, that he/she has completed a service request. In this manner, computing system 102 is provided with more complete information regarding the real-time status of a driver and can compute a more accurate and verified ETA at the customer.

Figure 2:
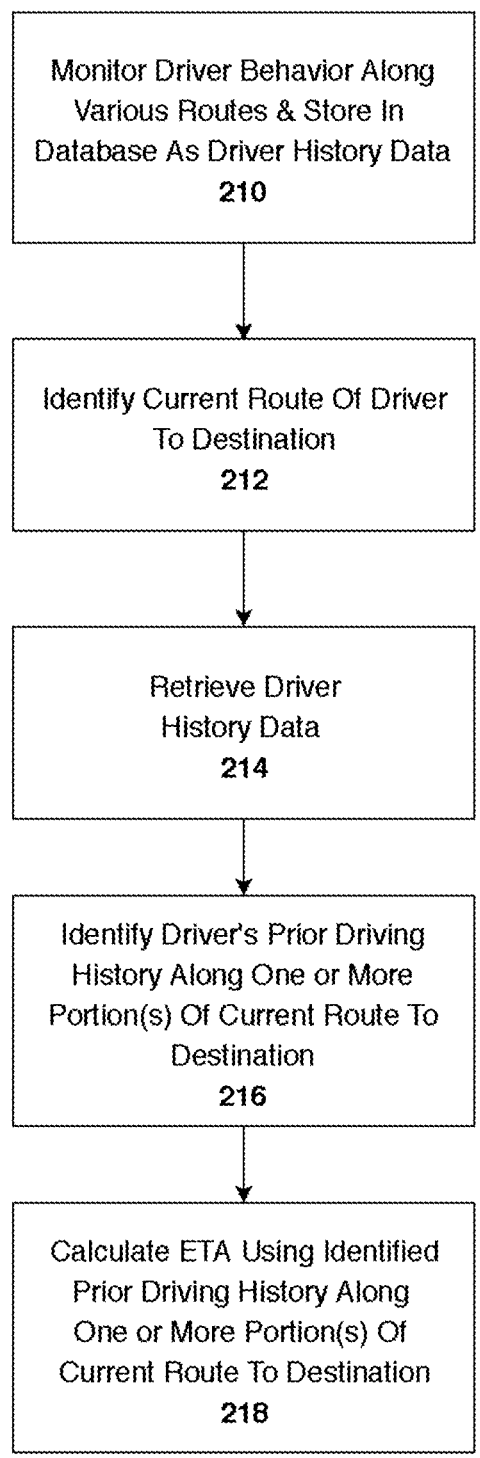
FIG. 2 is a flowchart illustrating an exemplary methodology for providing an automated individualized ETA of a driver to a destination, in accordance with exemplary embodiments of the inventive disclosure.

Referring next to FIG. 2, shown is a flowchart illustrating exemplary methodology 200 for providing an automated and individualized ETA of a driver for use in conjunction with system 100 and the methodologies thereof described herein. Various services and applications are known which commonly interface with one another in order to retrieve and present data relating to, for example, live traffic reporting. Such applications and systems can be utilized by system 100 in accordance with the methodologies described herein, and may be implemented on a personal computer, or via a mobile computing device (e.g., driver computing device 104) such as on a smartphone or in an in-vehicle GPS. Current systems calculate an ETT between two locations on a route by using the speed of other drivers along one or more segments of the same route and the distance of each segment. Such systems add ETTs along each segment (based on the current/present behavior of other drivers) together to estimate the total travel time from the user's current location, and hence, the ETA. Such systems calculate traffic parameters such as current traffic speed at a given road based on momentary locations of the users and advises the users of preferred roads to take in order to arrive at the requested location with minimum delay.

In certain embodiments, systems described herein may transmit locations and other data of its users to a central server. The other data can include information such as the type of vehicle (e.g., car, SUV, minivan, van, motorcycle, bicycle and the like) since it is contemplated that predicted speed of a driver often depends on a vehicle type the driver is driving. The other data can also include destinations/origins (e.g., home address, work address and the like), alerts, traffic information, messages and/or any other suitable data. The central server maps all the members and creates a traffic map. A plurality of personal navigation devices of the members has connectivity capability with a real time server by a cellular or wireless network. The members may send information on different events such as traffic information and/or alerts and/or messages to other members.

Systems which calculate current traffic speed (e.g., an average or estimated speed) for one or more route segment ahead of a particular driver based on a plurality of different drivers have an inherent deficiency, namely, that they do not account for the manner in which the particular driver (e.g., the driver who's estimated arrival time is being determined) will travel across the one or more route segments. They do not account for the particular driver's driving habits, and do not make any inferences about the driver's future travel along segments ahead of him/her on the route based on his/her current speed, his/her familiarity with the route segments, his/her typical driving speed with respect to other drivers on the route, and/or his/her prior driving history or habits. As further described below, such additional information and inferences can allow the system to calculate a more accurate ETA at a location for a particular driver.

It will be appreciated that improving an ETA calculation has numerous benefits and applications, both for individuals simply travelling to a location, and in dispatching scenarios where customers/passengers are on tight schedules. In dispatching scenarios, known methodologies for estimating an ETA may be particularly insufficient, not only because each driver may have individual driving characteristics and/or level of experience, but also because each driver may be in charge of a plurality of service requests or assigned trips in the same area during the same time period, and may modify a schedule based on various events as they arise. For example, a customer may be late for pick-up due to personal or professional reasons (e.g., an appointment may take longer than expected or the customer/passenger may have physical difficulties or needs). During a service request, a customer may request that a driver slow down, run an errand, etc. Additionally, some drivers may be inclined to drive faster than others, may take longer or shorter breaks, may take lunch breaks at different times, etc. Other drivers may be more comfortable in certain weather conditions and/or along certain routes. Automatically accounting for these factors can improve the process of estimating a driver's arrival time at a scheduled pick-up location or other destination, get the driver's location and/or ETA, etc. Such a process is highly efficient, prevents or minimizes time consuming transfer of information, and often results in more accurate information being relayed.

At Step 210, system 100 monitors each driver's speed (e.g., the speed of driver 106A, 106B, 106C) along one or more segments of routes the driver travels each day and stores this information in database 110. Additionally, or alternatively, system 100 may be configured to calculate an average speed of the driver along a certain road, street, avenue, city block, or stretch of highway during certain days and time of day, and record this information as driver history data in database 110. As discussed above, database 110 may also include posted speed limits along those routes, which may be automatically or manually entered. For example, computing system 102, using location data and time data received from location identifier 124 and clock mechanism 126 and stored in database 110, may determine that a driver averaged a speed of sixty (60) mph along a fifteen (15) mile stretch of highway on which the posted speed limit was fifty-five (55) mph, and that the driver did not stop to take any breaks along that stretch of highway. Computing system 102 may additionally or alternatively compare the average speed of other drivers using system 100 along that same fifteen (15) mile stretch of highway during a same or similar time of day and/or day of week. In this manner, computing system 102 can store, for each driver who travels along this stretch of highway, an average speed of the driver, an average number of miles per hour above or below the posted speed limit, etc., as well as an average number of miles per hour above or below other of its drivers traversing the same segment. Similarly, computing system 102 can monitor how long it takes each driver to travel from one general geographic region to another on certain days and at certain times, how many breaks the driver takes during that time period, etc., and how much more or less time it takes each driver to travel across each geographic region then the average time taken by all of its drivers. All of this information may be stored as driver historic data in database 110.

In certain embodiments, system 100 may be operatively coupled to a speed sensor in driver computing device 104 or in a speed sensor or speedometer in the vehicle of the driver to monitor the vehicle speed. For example, a driver's vehicle equipment may include a speedometer, an accelerometer, cameras, GPS technology, and any other applicable equipment. Utilization of this vehicle equipment may be used to obtain comprehensive real-time and historical activity information about the vehicle, such as its direction, speed, orientation and acceleration, etc. Various available methods for determining a driver's speed may also be incorporated, including use of third party APIs, such as GoogleMaps® and Waze®. Computing system 102 may also be configured to account for a driver's actual speed, average speed, and/or behavior history along one or more portions of his/her current route, in addition to available traffic information and other factors, to determine a more accurate ETA or ETT.

At Step 212, after receiving an inquiry from a customer as to his/her driver's status and checking the driver's location and status, computing system 102 identifies the current route of the driver assigned to the customer's service request. In certain embodiments, the current route of the driver is synced between driver computing device 104 and computing system 102 via network 120. In other words, the current route to the customer appearing on driver computing device 104 is also transmitted to computing system 102 (or generated by computing system 102). Alternatively, computing system 102 may make an inference as to the route the driver will take based on the driver's current position, the scheduled pick-up location of the service request, and the route indicated by one or more third party API's.

At Step 214, computing system 102 retrieves the driver history data associated with the driver assigned to the service request of the customer from database 110. At Step

216, computing system 102 identifies a portion of the retrieved driver history data associated with one or more segments of the driver's current route to the customer by comparing the retrieved driver history data for the driver with the current route (synced or inferred) to identify any portions of overlap. In other words, computing system 102 ascertains whether any portions of the driver's trip to the customer will overlap with any route segments along which computing system 102 has previously monitored the driver. If database 110 contains driver history data for virtually the entire route the driver is currently taking, or for one or more route segments along the current route, then computing system 102 can, as further discussed below, make an inference as to how long it will take the driver to traverse the route to the destination, and/or how long it will take the driver to traverse the route segments on the current route along with he/she has previously been monitored/tracked.

At Step 218, computing system 102 calculates an ETA using the identified prior driving history along one or more segments of the driver's route. Computing system 102 estimates a driver's arrival time at a customer pick-up location by not only looking at current and/or historic traffic conditions, but also by looking at the assigned driver's present rate of speed, a driver's LOF, other driver's speeds, etc., and by predicting what the assigned driver will do on each remaining segment of the route to the scheduled pick-up location (e.g., how fast he/she will drive on each segment of the route to the customer's pick-up location). For example, if over the course of a day, a week, or a month, a particular driver averages eight (8) miles per hour faster than the posted speed limit along one or more routes or route segments, or eight (8) miles per hour faster along the one or more routes than the average speed of a plurality of system drivers along the same one or more routes (or eight miles per hour faster than the average speed of the plurality of system drivers along other routes), then such data can be stored in database 110. Based on this historic data, computing system 102 can make an adjustment to the ETA for the particular driver (e.g., by assuming the particular driver will drive eight (8) miles per hour faster than the posted speed limit when traffic conditions allow it). It will be appreciated that if current traffic conditions along a particular route segment are such that, for example, very few drivers are driving at or above the speed limit (e.g., seventy-five percent (75%) are driving at a speed under the speed limit), then computing system 102 can be configured to infer that the route contains traffic, and that the particular driver's propensity to drive eight (8) mph faster than the speed limit will not apply along this particular segment.

By way of example, if Driver 1 is a system member who typically drives in the center or right lane of the highway eight (8) mph less the average speed of a plurality of other drivers, then when Driver 1 is travelling on a twenty (20) mile route along which the average calculated speed of system members is seventy (70) mph, the system can be configured to make an inference that Driver 1 will travel sixty-two (62) mph along the twenty (20) mile route, and estimate the time for Driver 1 to travel along this twenty (20) mile route based on a predicted speed of sixty-two (62) mph. Alternatively, if Driver 1 typically drives three (3) mph less than the speed limit along one or more routes, and the speed limit along Driver 1's present route is sixty (60) mph, then the system can be configured to infer that Driver 1 will travel at a predicted speed of fifty-seven (57) mph along the twenty (20) mile route. In either scenario, the system can calculate an individualized or personalized ETA for Driver 1.

In another example, if historical data associated with Driver 1 stored in database 110 includes Driver 1's prior speed and/or travel time (e.g., twenty (20) minutes) along the twenty (20) mile route, then the system may simply make an inference that Driver 1 will take the same amount of time to travel along this route. It will be appreciated, as described herein, that in any of these scenarios, the system may be configured to not make any inferences based on Driver 1's historical data if real-time (current) data received from its member drivers and/or a third-party API indicates that the twenty (20) mile route currently contains heavy or bumper to bumper traffic. In such scenarios, all drivers will tend to move uniformly.

Figure 3:
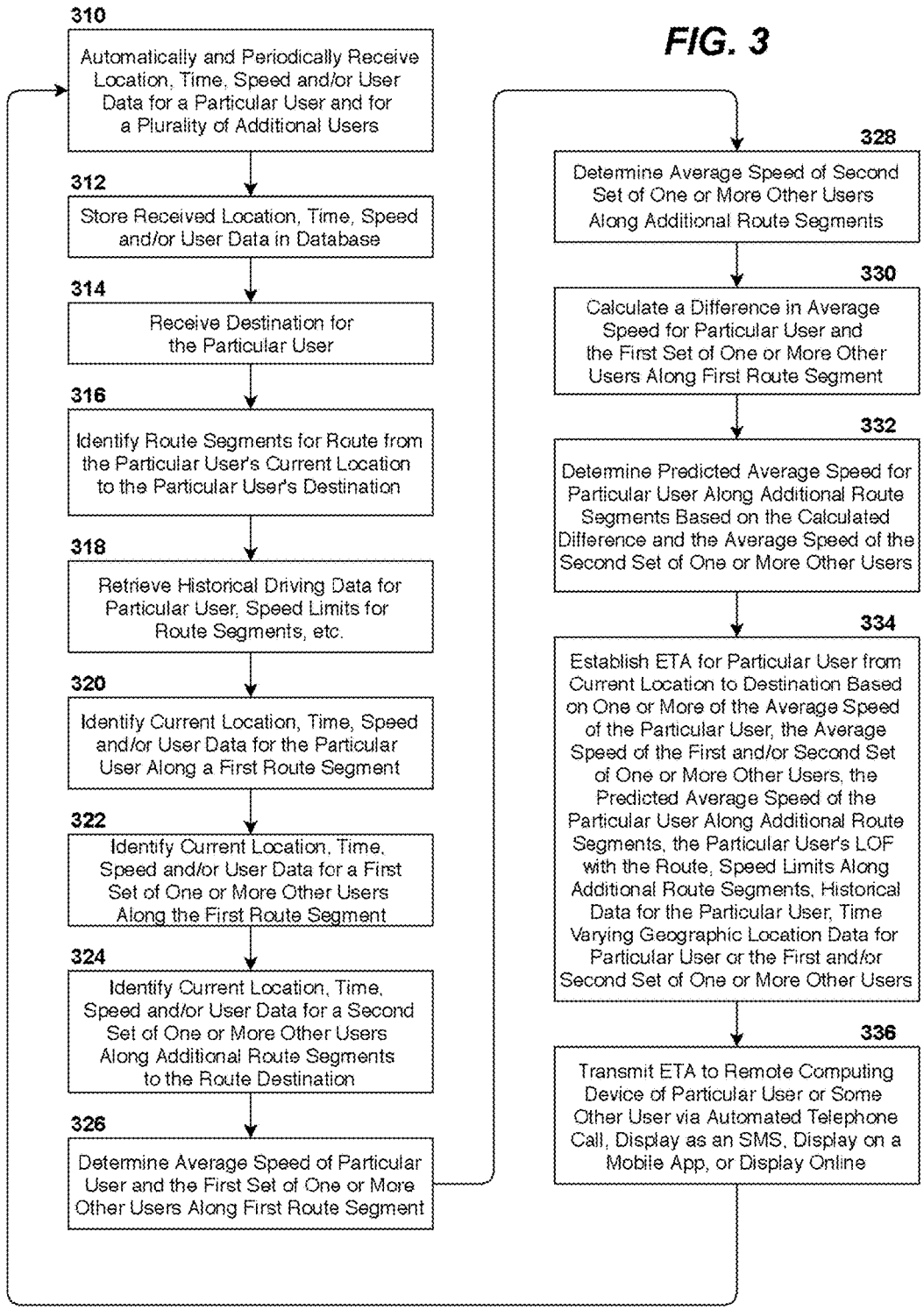
FIG. 3 is a flowchart illustrating exemplary steps for an automated and individualized ETA of a user from a current location to a destination location based on one or more of a variety of individualized factors (i.e., time, distance, driving history, LOF, speed limits, driver's average speed and/or other drivers' average speeds along the projected route, driver's habits and/or history, etc.), in accordance with exemplary embodiments of the inventive disclosure.

Referring next to FIG. 3, illustrated is a flow diagram of another exemplary process for determining an ETA of a driver or service provider from a current location to a destination location based on a variety of factors (i.e., time, distance, driving history, LOF, speed limits, driver's and/or other drivers' average speeds along the projected route, driver's habits and/or history, etc.), in accordance with exemplary embodiments of the inventive disclosure. An embodiment of the inventive disclosure may comprise a computer-implemented system and method for providing customizable route planning from a current identified location to a destination location.

As shown, at Step 310, system 100 may receive user data or information relating to location, time and user preferences from one or more remote computing devices. More particularly, system 100 receives, from driver computing device 104, a time-varying geographic location of a driver assigned to a service request using location data at a point in time generated by location identifier 124, wherein location identifier 124 comprises a GPS receiver configured to generate the location data. Optionally, the data may include user data that is categorized according to user types, including vehicle user type, motorcyclist user type, cyclist user type, or pedestrian user type. At Step 312, the system stores the received information in one or more databases and at Step 314 receives a destination location from a particular user. Based on the received user data and destination location, at Step 316, the system formulates an initial route plan from the identified current location to the destination location based on time and/or distance. At Step 318, system 100 additionally retrieves historical driving data for the particular driver assigned to the service request, as well as speed limits and other information associated with route segments of the initial route plan. The system identifies a total distance from the current geographic location of the driver and the scheduled destination. The system, at Step 320 identifies current location, time, speed, and/or user data of the driver along a first route segment of the current route, at Step 322 identifies current location, time, speed, and/or user data of a first set of one or more other drivers along the first route segment of the current route, and at Step 324 identifies current location, time, speed, and/or user data of a second set of one or more other drivers along one or more additional route segments of the current route.

At Step 326, the system then determines an average speed of the driver and an average speed of the first set of one or more other drivers along the first route segment. At Step 328, the system determines an average speed of the second set of one or more other drivers along all of the additional route segments from the current location to the destination. At Step 330, the system then determines or calculates a difference in average speed between the average speed of the driver along the first route segment and the average speed of the first set of one or more other drivers along the first route segment. At Step 332, the system determines or calculates a predicted average speed of the driver along the one or more additional route segments of the current route based on the determined difference in average speed (e.g., by applying the difference between the particular driver's average speed along the first route segment and the average speed of the first set of one or more drivers along the first route segment to the average speed of the second set of one or more other drivers along the additional route segments). The system then establishes, at Step 334, an ETA for the driver from the current geographic location of the driver to the scheduled destination location, the ETA being based on at least one or more of time-varying geographic location data of the driver, the location data being updated in real-time, the average speed of the driver along the first segment, the average speed of the first set of one or more other drivers along the first route segment, and the average speed of the second set of one or more other drivers along the one or more additional route segments, the predicted average speed of the driver, one or more speed limits along one or more route segments of the driver to the scheduled destination, an LOF of a driver along the route segments, or a retrieved portion of the historic data associated with the driver. At Step 336, the system may then transmit the ETA of the driver (e.g., at the scheduled pick-up location) to a user device, via an automated phone call, an SMS message, an application notification for display on, for example, a smartphone, or to an online website.

In certain embodiments, ETAs may be automatically and periodically determined, and the frequency with which they are determined may also vary. For example, the system's initial rate of the driver or vehicle ETA determination may be every five (5) minutes. At a first instance in time, when t=t1, the vehicle ETA may be determined to be at sixteen (16) minutes. The next instance in time, t=t2, the vehicle ETA may be determined to be at twelve (12) minutes, which is, for example, 1 minute slower than expected. At an instance when the system determines that vehicle's speed falls below a certain threshold, the system may vary the vehicle's ETA determination rate (a second rate) by making it, for example, every three (3) minutes, and so on. The next time, when t=t3, the system may determine that the vehicle's ETA is still one (1) minute later than originally anticipated by the system. The system can then periodically determine the vehicle's ETA at the second rate until it determines that the vehicle speed is again above a certain threshold. Once the system determines that the vehicle's speed is above a certain threshold, the system may determine the driver or vehicle ETA at the initial rate (e.g., every five (5) minutes). Note that the ETA can change over time as vehicles change positions and/or drivers change statuses, such as from being available to unavailable or from being unavailable to available.

In certain other embodiments, the system may automatically and periodically determine the ETAs at three (3) different rates. The system may have been periodically determining ETAs at a first rate, such as every five (5) minutes, and then the system may determine that the ETAs are below a first threshold amount (e.g., five (5) minutes), the system can start to periodically determine ETAs at a second rate (e.g., every three (3) minutes). When the system determines that the ETAs are below a second threshold amount (e.g., three (3) minutes), the system can start to periodically determine ETAs at a third rate (e.g., every one (1) minute). In this manner, the system can dynamically check for ETA updates more frequently as the vehicle's speed varies or fluctuates.

Additionally, computing devices 104 may calculate the vehicles' velocity and store the velocity in memory (e.g., in database 110) in association with the route segment on which the vehicles are driving at the time the velocity is calculated. The velocity of a given vehicle may be periodically sampled and the memory updated, with an average velocity calculated by a processor in the computing device for the route segment being traversed. This activity may continue for each additional route segment of the route to the destination. It will be appreciated that over time, the stored average value for a given route segment will be accurately indicative of the driving habits of a particular driver for a route segment, as well as the average driving speeds for other drivers on those route segments.

After the system establishes the route and stores it in memory 114 or in database 110, processor 112 may retrieve the driver's historical driving data relating to the past trips along all or a portion of the route. After identifying the relevant historical data, processor 112 accesses and loads the driving velocities for the input driver from memory (e.g., retrieved from database 110) for each road segment over the course of the route. Processor 112 may then calculate the ETA based upon the route to be traversed and the historical velocities stored in database 110 for each route segment along the route. For example, in one embodiment, if the route to the destination consists of 3 route segments as follows: Segment 1 (S1)—point A to point B with a distance (D1) of 10 miles and a posted speed limit of 45 mph; Segment 2 (S2)—point B to point C with a distance (D2) of 15 miles and a posted speed limit of 65 mph; and Segment 3 (S3)—point C to point D with a distance (D3) of 5 miles and a posted speed limit of 25 mph. If historical data shows that the driver's average speed (AS1) over Segment 1 was 48 mph, average speed (AS2) over Segment 2 was 70 mph, and average speed (AS3) over Segment 3 was 26 mph, then the ETA from point A (i.e., the driver's current location), to point D may be calculated as follows:

$$\begin{aligned} ETA &= (D1/AS1) + (D2/AS2) + (D3/AS3) \quad &\text{(Eq. 1)}\\ &= (10 \text{ miles}/48 \text{ mph}) + (15 \text{ miles}/70 \text{ mph}) + \\ &\quad (5 \text{ miles}/26 \text{ mph}) \\ &= 0.208 \text{ hr} + 0.214 \text{ hr} + 0.192 \text{ hr} \\ &= 0.614 \text{ hr} \\ &= 36.84 \text{ min} \\ &= 36 \text{ min } 50 \text{ sec} \end{aligned}$$

In another embodiment, for example, assuming the same route to the destination (i.e., consisting of three (3) route segments as follows: Segment 1 (S1)—point A to point B with a distance (D1) of 10 miles and a posted speed limit of 45 mph; Segment 2 (S2)—point B to point C with a distance (D2) of 15 miles and a posted speed limit of 65 mph; and Segment 3 (S3)—point C to point D with a distance (D3) of 5 miles and a posted speed limit of 25 mph. If historical data shows that the driver's average speed versus other drivers (ASVOD1) over Segment 1 was exceeding by 3 mph, average speed versus other drivers (ASVOD2) over Segment 2 was exceeding by 5 mph, and average speed versus other drivers (ASVOD3) over Segment 3 was exceeding by 2 mph, and presently obtained velocity data for other drivers on route Segments 1-3 are as follows: average speed of other drivers on Segment 1 is 47 mph (ASOD1), on Segment 2 is 68 mph (ASOD2), and on Segment 3 is 25 mph (ASOD3), then the ETA from point A (i.e., the driver's current location), to point D may be calculated as follows:

$$ETA = [D1/(ASOD1 + ASVOD1)] + [D2/(ASOD2 + ASVOD2)] + \quad \text{(Eq. 2)}$$
$$[D3/(ASOD3 + ASVOD3)]$$
$$= [10 \text{ mi}/(47 \text{ mph} + 3 \text{ mph})] + [15 \text{ mi}/(68 \text{ mph} +$$
$$5 \text{ mph})] + [5 \text{ mi}/(25 \text{ mph} + 2 \text{ mph})]$$
$$= [10 \text{ mi}/50 \text{ mph}] + [15 \text{ mi}/73 \text{ mph}] + [5 \text{ mi}/27 \text{ mph}]$$
$$= 0.200 \text{ hr} + 0.205 \text{ hr} + 0.185 \text{ hr}$$
$$= 0.590 \text{ hr}$$
$$= 35.40 \text{ min}$$
$$= 35 \text{ min } 24 \text{ sec}$$

In yet a further embodiment, for example, again assuming the same route to the destination (i.e., consisting of 3 route segments as follows: Segment 1 (S1)—point A to point B with a distance (D1) of 10 miles and a posted speed limit of 45 mph; Segment 2 (S2)—point B to point C with a distance (D2) of 15 miles and a posted speed limit of 65 mph; and Segment 3 (S3)—point C to point D with a distance (D3) of 5 miles and a posted speed limit of 25 mph), historical data may further indicate that the driver has a particular level or degree of familiarity with one or more segments of the route to the destination.

The LOF may be represented as a percentage and may be displayed by itself as a percentage, or it may be divided into tiers, for example, tier E may reflect a familiarity between zero to nineteen (0-19) percent, tier D between twenty to thirty-nine (20-39) percent, tier C between forty to fifty-nine (40-59) percent, tier B between sixty to seventy-nine (60-79) percent, and tier A between eighty to one hundred (80-100) percent. Such a representation of tiers need not be limited to A through E or even letters at all, as tiers may be shown as any single one or combination of depictions that divides the familiarity percentages by tier. The tier and percentage may also be shown together. This set of indicators may be used by service providers to evaluate where they have the most experience or may be the most valuable, or it may be used by a customer in selecting a best matching service provider based on the experience he/she may have with the service request.

According to studies, for example, see "The Impact of Route Familiarity on Drivers' Speeds, Trajectories and Risk Perception" by Paolo Intini, Department of Civil, Environmental, Building Engineering and Chemistry, Polytechnic University of Bari, which is hereby incorporated by reference herein in its entirety, speed choice is affected by route familiarity (i.e., speed increases with the repetition of travels on the same route, especially if the travels are on consecutive days). The speed increasing tendency is different according to the risk inclination of the drivers and according to the different road geometric characteristics. That is, the process of trajectory selection at curves is also influenced by route familiarity (i.e., the radius of curvature of the trajectories selected by the drivers at curves increase with the repetition of travels on the same route, showing curve-cutting and encroachments). As for what concerns the speed selection process, the comparison between the different speed driving conditions (i.e., free speed choice, driving at low speed, driving at medium speed, driving at high speed, etc.) showed some noticeable tendencies. On combining these results, the study showed that route familiarity is clearly influential on the driving process. For example, one such study yielded the following results (as shown in Tables 1-5 below) demonstrating the effect of route familiarity on driving speed.

TABLE 1

Driving Speeds for Outbound and Return Trips for Tests on 4 Consecutive days

| Test Condition | Road Section | Day 1 | Day 2 | Day 3 | Day 4 |
|---|---|---|---|---|---|
| Average | C1 (O) | 53.8 | 54.1 | 56.2 | 57.5 |
|  | C3 (O) | 70.4 | 70.7 | 74.6 | 73.4 |
|  | C1 (R) | 56.4 | 57.2 | 58.3 | 58.4 |
|  | C3 (R) | 74.8 | 76.9 | 79.0 | 79.8 |

TABLE 2

Average Speed Change Between Test Days

| Days 1-2 | Days 2-3 | Days 2-4 |
|---|---|---|
| 0.3 | 2.1 | 1.3 |
| 0.3 | 3.9 | −1.2 |
| 0.8 | 1.1 | 0.1 |
| 2.1 | 2.1 | 0.8 |
| 0.875 | 2.300 | 0.250 |

TABLE 3

Average Percent Change in Speed Between Test Days

| Days 1-2 | Days 2-3 | Days 3-4 |
|---|---|---|
| 0.56% | 3.88% | 2.31% |
| 0.43% | 5.52% | −1.61% |
| 1.42% | 1.92% | 0.17% |
| 2.81% | 2.73% | 1.01% |
| 1.31% | 3.51% | 0.47% |

TABLE 4

Average Speed Change Between Test Days

| Days 1-2 | Days 1-3 | Days 1-4 |
|---|---|---|
| 0.3 | 2.4 | 3.7 |
| 0.3 | 4.2 | 3.0 |
| 0.8 | 1.9 | 2.0 |
| 2.1 | 4.2 | 5.0 |
| 0.88 | 3.18 | 3.43 |

TABLE 5

Average Percent Change in Speed Between Test Days

| Days 1-2 | Days 1-3 | Days 1-4 |
|---|---|---|
| 0.56% | 4.46% | 6.88% |
| 0.43% | 5.97% | 4.26% |
| 1.42% | 3.37% | 3.55% |
| 2.81% | 5.61% | 6.68% |
| 1.31% | 4.85% | 5.34% |

Each of these three (3) daily segments (i.e., Days 1-2, Days 1-3, and Days 1-4) correlate to an LOF of the route by the driver. That is, Table 5 shows in column "Days 1-2" the percent change in speed between the speed on day 1 versus on day 2. Similarly, the column "Days 1-3" shows the percent change in speed between the speed on day 1 versus on day 3, and the column "Days 1-4" shows the percent change in speed between the speed on day 1 versus on day 4. For example, a correlation may be based on the percentage of the route traveled by the drivers as well as the number of times the drivers traveled the route, and may, in one embodiment, include: by Day 2 the drivers had a thirty-three percent (33%) LOF, by Day 3 the drivers had a sixty-seven percent (67%) LOF, and by Day 4 the drivers had a familiarity of the route at or near one hundred percent (100%). Accordingly, by way of example, this shows that the drivers' average increase in speed was 5.34% (AIS1) when the LOF was at or near one hundred percent (100%), was 4.85% (AIS2) when the LOF was approximately sixty-seven percent (67%), and was 1.31% (AIS3) when the LOF was thirty-three percent (33%).

Using the above test data as an example, an individualized ETA calculation may be performed in accordance with embodiments disclosed herein. More particularly, continuing with the example described above, when the driver traverses the route for the first time with zero percent (0%) LOF, his/her average speed over Segment 1 (AS1) is forty-eight (48) mph, his/her average speed over Segment 2 (AS2) is seventy (70) mph, and his/her average speed over Segment 3 (AS3) is twenty-six (26) mph. His/her ETA may therefore be predicted as:
0% LOF $$ETA = (D1/AS1) + (D2/AS2) + (D3/AS3) \quad \text{(Eq. 3)}$$
$$= (10 \text{ miles}/48 \text{ mph}) + (15 \text{ miles}/70 \text{ mph}) +$$
$$(5 \text{ miles}/26 \text{ mph})$$
$$= 0.208 \text{ hr} + 0.214 \text{ hr} + 0.192 \text{ hr}$$
$$= 0.614 \text{ hr}$$
$$= 36.84 \text{ min}$$
$$= 36 \text{ min } 50 \text{ sec}$$

The second day the driver traverses the route, he/she has a thirty-three percent (33%) LOF, and his/her ETA is predicted as:
33% LOF $$ETA = [D1/(AS1 + (AS1 * AIS3))] + [D2/(AS2 + \quad \text{(Eq. 4)}$$
$$(AS2 * AIS3))] + [D3/(AS3 + (AS3 * AIS3))]$$
$$= [10 \text{ mi}/(48 \text{ mph} + (48 \text{ mph} * 0.0131))] +$$
$$[15 \text{ mi}/(70 \text{ mph} + (70 \text{ mph} * 0.0131))] +$$
$$[5 \text{ mi}/(26 \text{ mph} + (26 \text{ mph} * 0.0131))]$$
$$= [10 \text{ mi}/48.63 \text{ mph}] + [15 \text{ mi}/70.92 \text{ mph}] +$$
$$[5 \text{ mi}/26.34 \text{ mph}]$$
$$= 0.206 \text{ hr} + 0.212 \text{ hr} + 0.190 \text{ hr}$$
$$= 0.608 \text{ hr}$$
$$= 36.48 \text{ min}$$
$$= 36 \text{ min } 29 \text{ sec}$$

The third day the driver traverses the route, he/she has a sixty-seven percent (67%) LOF, and his/her ETA is predicted as:
67% LOF $$ETA = [D1/(AS1 + (AS1 * AIS2))] + [D2/(AS2 + \quad \text{(Eq. 5)}$$
$$(AS2 * AIS2))] + [D3/(AS3 + (AS3 * AIS2))]$$
$$= [10 \text{ mi}/(48 \text{ mph} + (48 \text{ mph} * 0.0485))] +$$
$$[15 \text{ mi}/(70 \text{ mph} + (70 \text{ mph} * 0.0485))] +$$
$$[5 \text{ mi}/(26 \text{ mph} + (26 \text{ mph} * 0.0485))]$$
$$= [10 \text{ mi}/50.33 \text{ mph}] + [15 \text{ mi}/73.40 \text{ mph}] +$$
$$[5 \text{ mi}/27.26 \text{ mph}]$$
$$= 0.199 \text{ hr} + 0.204 \text{ hr} + 0.183 \text{ hr}$$
$$= 0.586 \text{ hr}$$
$$= 35.16 \text{ min}$$
$$= 35 \text{ min } 10 \text{ sec}$$

The fourth day the driver traverses the route, he/she has a one hundred percent (100%) LOF, and his/her ETA is predicted as:
100% LOF $$ETA = [D1/(AS1 + (AS1 * AIS1))] + [D2/(AS2 + \quad \text{(Eq. 6)}$$
$$(AS2 * AIS1))] + [D3/(AS3 + (AS3 * AIS1))]$$
$$= [10 \text{ mi}/(48 \text{ mph} + (48 \text{ mph} * 0.0534))] +$$
$$[15 \text{ mi}/(70 \text{ mph} + (70 \text{ mph} * 0.0534))] +$$
$$[5 \text{ mi}/(26 \text{ mph} + (26 \text{ mph} * 0.0534))]$$
$$= [10 \text{ mi}/50.56 \text{ mph}] + [15 \text{ mi}/73.74 \text{ mph}] +$$
$$[5 \text{ mi}/27.39 \text{ mph}]$$
$$= 0.198 \text{ hr} + 0.203 \text{ hr} + 0.183 \text{ hr}$$
$$= 0.584 \text{ hr}$$
$$= 35.04 \text{ min}$$
$$= 35 \text{ min } 2 \text{ sec}$$

In certain embodiments, the system may be configured to display an average LOF for a route having multiple legs, i.e. from a driver's location to a pickup location (first leg) and a second LOF from the pick up location to the drop off location (second leg). By way of example, if a driver has 30% LOF with a first 3 mile leg and 50% LOF with a second 5 mile leg, then the average LOF for the driver for the entire route may be displayed as 40%. Thus, while the preferred embodiment is that LOF be displayed for each of the routes separately, the system may also display an average LOF for the entire route having multiple legs.

In yet other embodiments, the average LOF may account for the length of each route segment:

$$\text{Average LOF (\%)} = [(30)*3 + 50*5]/8 = (90+250)/8 = 42.5\% \quad \text{(Eq. 7)}$$

Figure 4:
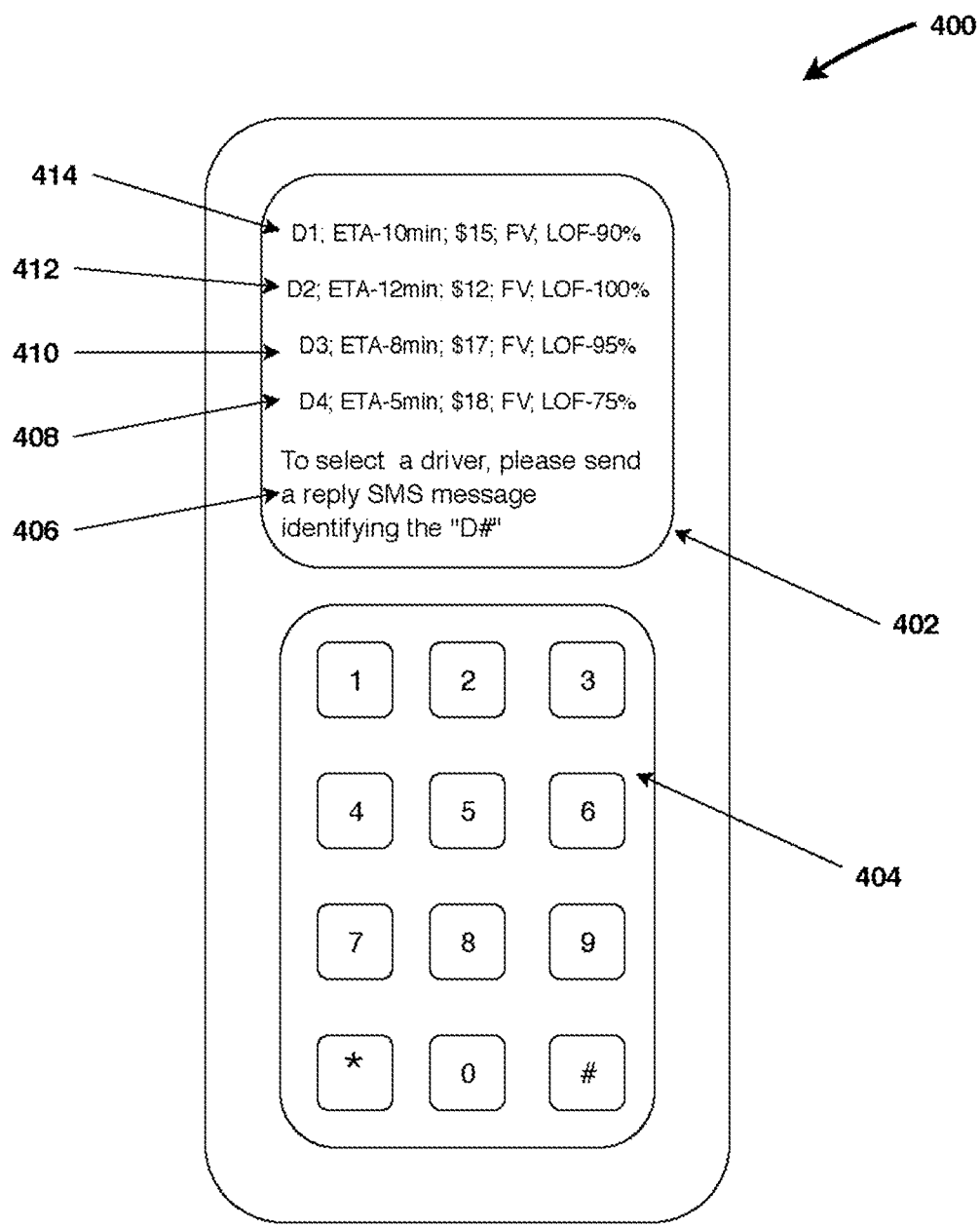
FIG. 4 depicts a schematic representation of an SMS capable telephone or smartphone showing driver information, including individualized ETA information, arranged by the system in response to a trip request, in accordance with exemplary embodiments of the inventive disclosure.

Referring to FIG. 4, shown is a schematic representation of an SMS capable phone 400 displaying driver information, including individualized ETA information, via an SMS message (or via a webpage online) arranged by the system, in accordance with exemplary embodiments of the inventive disclosure. As depicted, driver information in response to a customer's service request may be displayed on display 402 of phone 400. For example, display 402 may include a list of available drivers as noted with identifications D1-D4, each further having additional relevant information 408, 410, 412, 414 to assist the customer in selecting via keypad 404 the driver best suited for his/her needs. For example, each driver D1-D4 may have an ETA to the pick-up location, a cost of the ride to the destination, an indication that the driver is a favorite driver (e.g., "FV") or a preferred driver, etc., and the driver's LOF with the route (i.e., not only for the route from the pick-up location to the customer's desired destination, but also for the route from the driver's current location to the pick-up location). Instructions 406 may also be displayed informing the customer how to select the service provider (e.g., by displaying "To select a driver, please send a reply SMS message identifying the "D#".").

Figure 5:
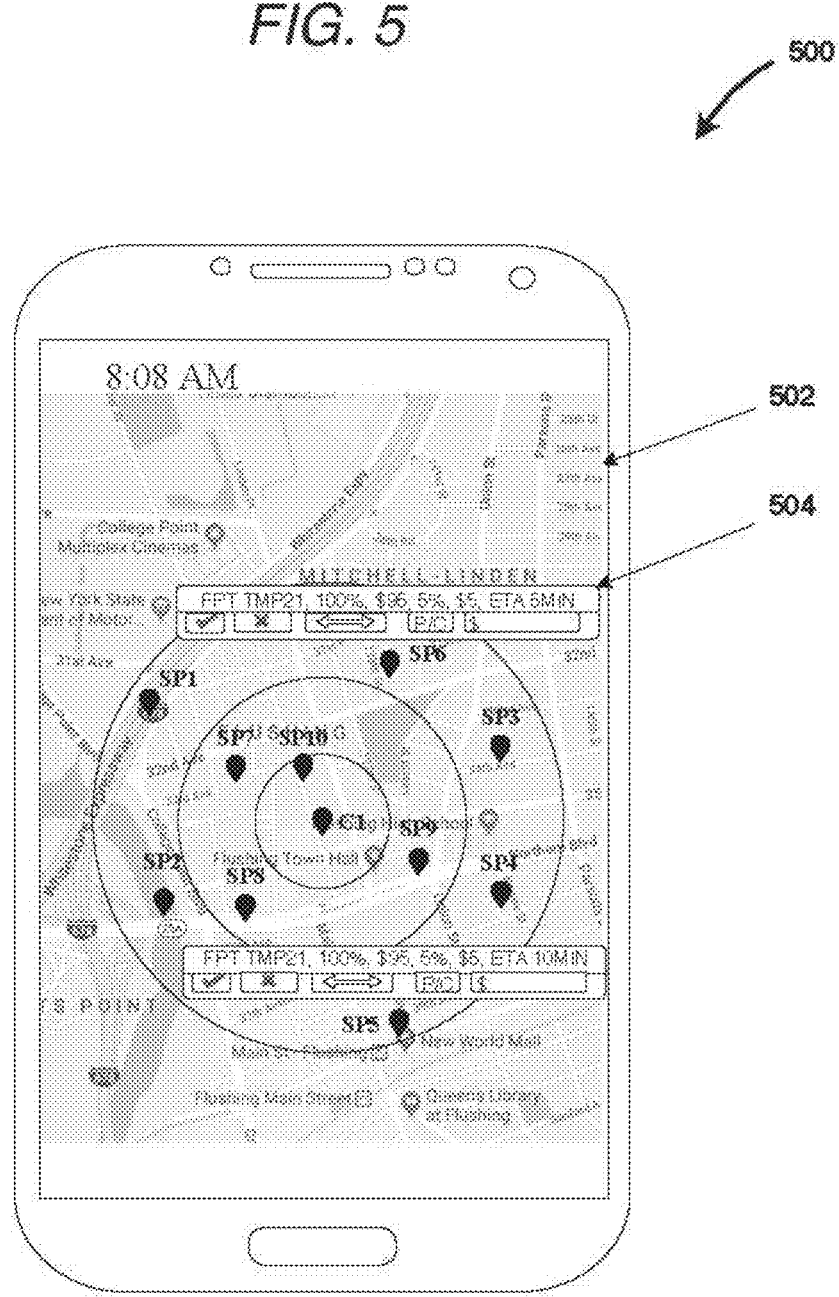
FIG. 5 depicts a schematic representation of a smartphone showing driver information, including indicators with individualized ETA information, arranged by the system in response to a trip request, in accordance with exemplary embodiments of the inventive disclosure.

Turning to FIG. 5, depicted is a schematic representation of a smartphone showing driver information including indicators with individualized ETA information, arranged by the system in response to a trip request, in accordance with exemplary embodiments of the inventive disclosure. As shown, in certain embodiments, details in response to a customer's service request may be displayed on display 502 of phone 500. For example, the display may include a group of indications (i.e., C1 and SP1-SP10), each further having additional relevant information presented through one or more indicator sets 504 to assist the customer in selecting the service provider best suited for his/her needs. For example, as shown, service provider SP6's information may be provided by indicators 504 showing "FPT; TMP21; 100%; $95; 5%; $5; ETA 5 Min" meaning that he/she is a favorite service provider for transport service "RPT," that SP6 has completed 21 trips with the customer, that SP6 has a one hundred percent (100%) route familiarity with the requested route in the service request, that SP6's proposed price is $95, which is five percent (5%) or $15 higher than the default price, and that SP6's ETA to the requested pick-up location is 5 minutes. While indicator 504 is shown as having several (i.e., seven (7)) pieces of relevant information, it will be understood that any number of pieces of information may be used in accordance with the inventive disclosure. For example, in certain embodiments, only LOF (or route familiarity) and ETA may be displayed for the user. In yet other embodiments, instructions may also be displayed informing the customer how to select a route or select a service provider.

Figure 6:
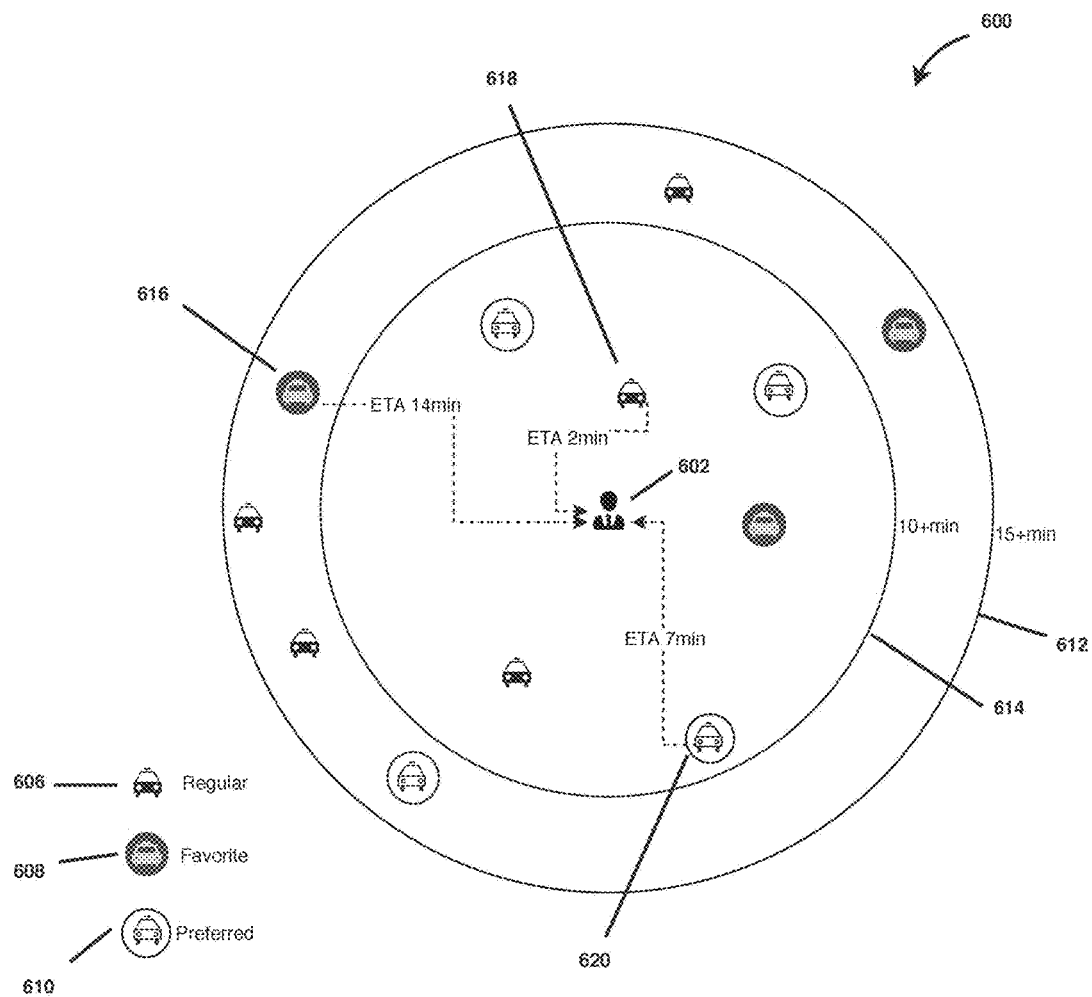
FIG. 6 depicts an exemplary visual representation of driver information, including ETA information, arranged by the system in response to a trip request, in accordance with exemplary embodiments of the inventive disclosure.

Additionally, FIG. 6 shows representation 600 of driver information, including ETA information, arranged by the system in response to a trip request. Representation 600 depicts a location of customer 602 at a center of the diagram, travel time ranges (i.e., a range of 10+ minutes 614, a range of 15+ minutes 612), and a plurality of available drivers by vehicle or driver type (e.g., regular driver 606, 618, favorite driver 608, 616, preferred driver 610, 620, etc.). As shown, customer 602 placing a trip request via the phone requests a driver/vehicle immediately, and is depicted in the center of representation 600 with respect to a plurality of vehicles within the time travel ranges. The system automatically and periodically tracks time-varying geographic location of vehicles using time-varying geographic location information provided by location identifiers 124 of remote driver computing devices 104 or tracking devices in each of the vehicles (e.g., via separate GPS units, location identifiers in mobile phones, or built into the vehicle, etc.). The time-varying geographic location information is stored and dynamically updated in the system database 110 so that the system may determine that regular driver 618 can reach customer 602 within two (2) minutes, that available preferred driver 620 can reach customer 602 in seven (7) minutes, and that favorite driver 616 of customer 602 can reach him/her in fourteen (14) minutes. Alternatively, such driver and ETA information may be displayed to customer 602 in a list format.

The information shown in representation 600 may also be in or converted to text and transmitted through an SMS gateway to customer 602 to provide him/her with the option to select a driver (e.g., regular driver 618 in only two (2) minutes, preferred driver 620 in seven (7) minutes, or favorite driver 616 in fourteen (14) minutes). Similarly, the information shown in representation 600 may be in or converted to voice or audio and transmitted through a phone network to customer 602 to provide him/her with the option to select a driver. If customer 602 is in a hurry he/she might select regular driver 618 because it is the nearest available. If customer 602 is cost conscious, he/she might select preferred driver 620, which may be the least expensive, or customer 602 may opt for the preferred driver 620 over regular driver 618. Alternatively, customer 602 may want the familiarity and comfort of using favorite driver 616 even though he/she will take longer to arrive at the pick-up location. Based on the selection options provided, customer 602 selects a driver, which then updates the dispatch request in the dispatch system. A selected driver is then notified and engaged to complete the trip request according to the trip details.

Figure 7A:
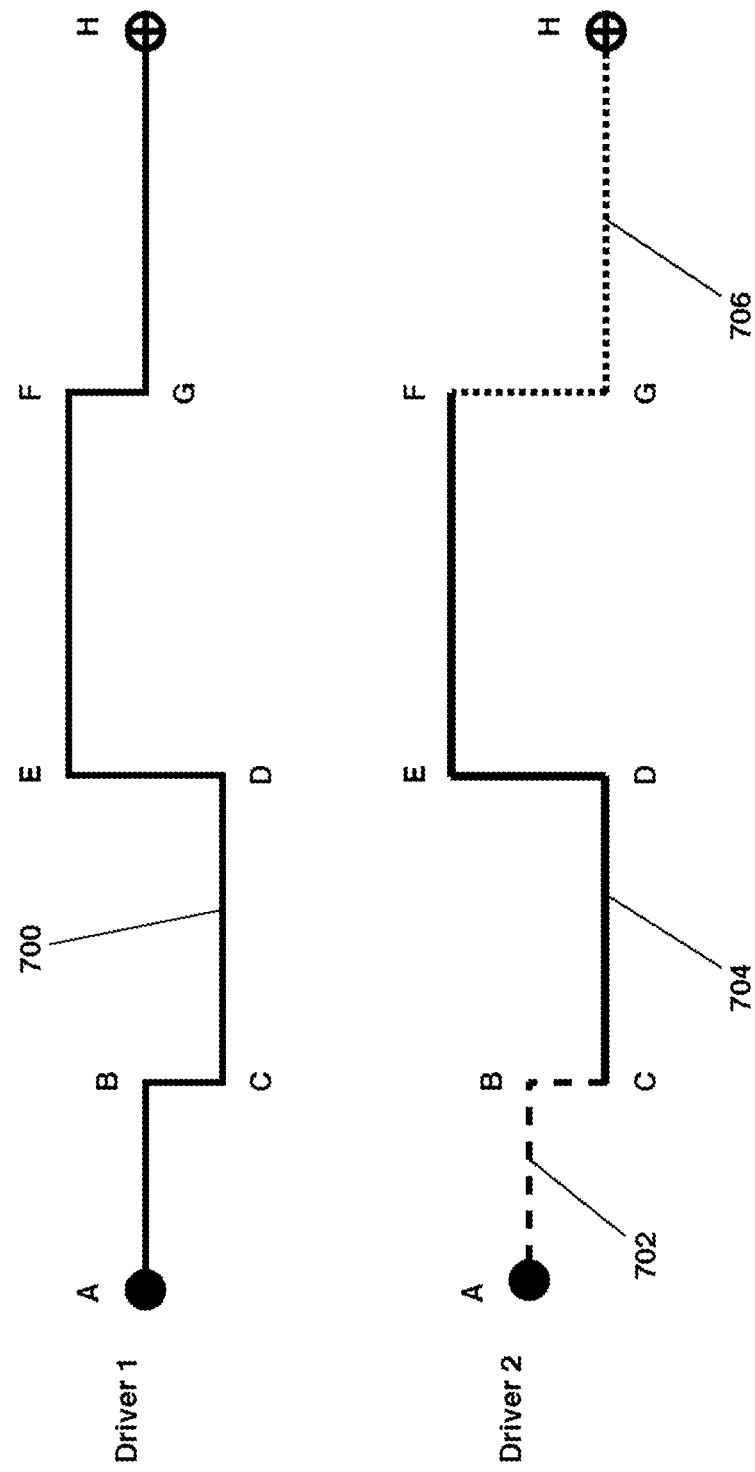
FIG. 7A illustrates one exemplary format for depicting route familiarity for multiple drivers on a display device, further depicting direct familiarity versus indirect familiarity, in accordance with exemplary embodiments of the inventive disclosure.

FIGS. 7A-7B illustrate exemplary formats for depicting route familiarity for multiple drivers on a display device. In particular, FIG. 7A, for example, depicts direct familiarity versus indirect familiarity in accordance with exemplary embodiments of the inventive disclosure. As shown, Driver 1 may have a one hundred percent (100%) direct familiarity with route 700 from point A to point H, which may be displayed via a single solid line from point A to point H. On the other hand, for Driver 2, who may also have a one hundred percent (100%) familiarity with the route from point A to point H, his/her familiarity is shown as indirect. That is, Driver 2 may have one hundred percent (100%) indirect familiarity with route segment 702 from point A to point C, as depicted with a dashed line. Driver 2 may also have one hundred percent (100%) direct familiarity with route segment 704 from point C to point F, as depicted with a solid line. Driver 2 may further have one hundred percent (100%) indirect familiarity with route segment 706 from point F to point H, as depicted with a dotted line. Altogether, Driver 2 has a one hundred percent (100%) indirect familiarity with the route from point A to point H. Of course, it will be appreciated that other formats, such as stars, patterns, colors, etc. may also be used to depict different degrees of familiarity with different routes or route segments.

Referring to FIG. 7B, illustrated is another exemplary format for depicting route familiarity for multiple drivers on a display device where different formats are used to depict or display route familiarity for drivers based on the number times a route has been travelled by the particular driver. For example, different formats may be used to display a degree of familiarity for each driver based on the number of times the driver has travelled the route. As shown, a solid line may be used to indicate that Driver 1 has traversed route 708 from point A to point H a certain number of times (e.g., fifty (50) times). Alternatively, the solid line may be used to indicate that the Driver 1 traversed route 708 a number of times that fall within a certain range (e.g., fifty to one hundred (50-100) times). Alternatively, a dashed line may be used to indicate that Driver 2 has traversed route 710 from point A to point H a certain lesser number of times (e.g., twenty-five (25) times), or a lower range (e.g., twenty-five to forty-nine (25 to 49)). Further, a third format may be used to show an even lesser number of times a driver traversed the route. For example, a dotted line may be used to indicate that Driver 3 has traversed route 712 from point A to point H an even lesser number of times (e.g., ten (10) times), or an even lower range (e.g., zero to twenty-four (0 to 24)). It will be appreciated that different formats, such as stars, patterns, colors, etc., may also be used to depict different number of times a driver has traversed a route. It will also be appreciated that the different format used for display in FIGS. 7A-7B may also be combined to provide even further details regarding a driver's LOF with a given route.

Figure 8:
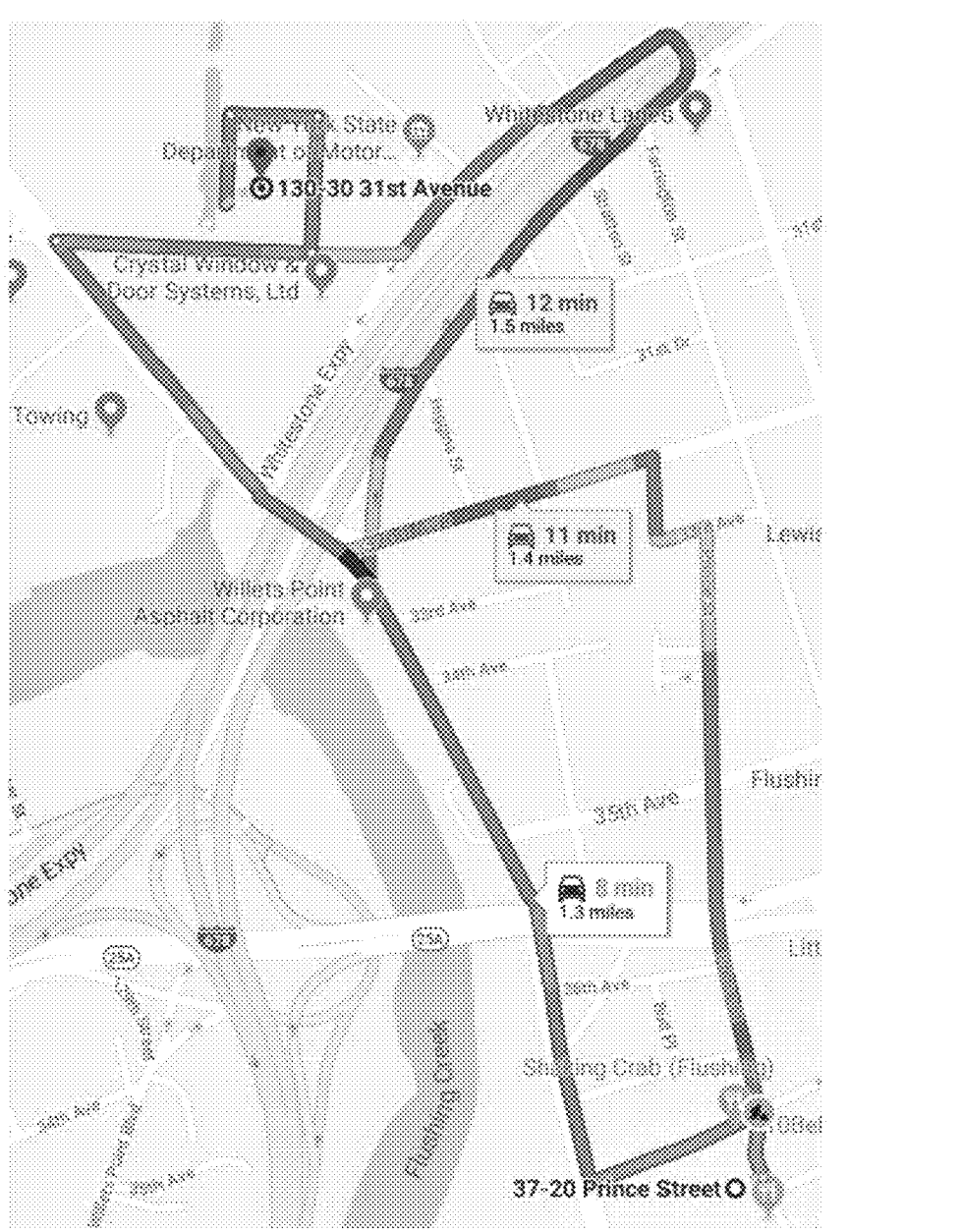
FIG. 8 depicts an exemplary representation of a map interface highlighting multiple possible routes to a destination location, further depicting differing ETA information for each route, in accordance with exemplary embodiments of the inventive disclosure.

With reference to FIG. 8, depicted is an exemplary representation of a map interface highlighting multiple possible routes to a destination location, further depicting differing ETA and/or driver LOF information for each route, in accordance with exemplary embodiments of the inventive disclosure. Such ETA and/or driver LOF information may be employed or displayed for use by either a customer or a driver travelling to a destination. With respect to the customer, such differing ETA and/or LOF information may be displayed for one or more different drivers in order for the customer to be able to select the driver of his/her choice. Similarly, differing ETA and/or LOF information may be displayed on a driver's display interface to a driver for one or more different customers indicating to the driver ETA and/or LOF data to pick-up locations of the one or more customers. For drivers, the differing ETA may be displayed in a manner such that when accounting for the driver's LOF, the driver's driving habits, etc., a route having a greater distance may have a shorter ETA, thereby enabling the driver to select the route having the shortest ETA.

As shown, in response to a trip or service request, the system may display, for example, on map interface 800, a plurality of possible routes to a destination location highlighting different ETAs for each route. For example, as depicted, a first route may have an ETA of eight (8) minutes, a second route may have an ETA of eleven (11) minutes, and a third route may have an ETA of twelve (12) minutes. The system may further adjust the ETA for one or more of the displayed routes based on various characteristics, such as an LOF of the driver with the segments of the route, a geometry of the route segments, whether the route is a return of a route preceding the return and a level of similarity of the return and the route preceding the return, a vehicle type driven by the driver, bottlenecks along the route, an age group of the driver, a gender of the driver, a time frame the driver is travelling along the route segments, one or more speed limits along the route segments, or a retrieved portion of the historic data associated with the driver. In particular, based on an LOF of the driver, the system may adjust the ETA for the second route because the driver is most familiar with that route and can determine that the particular driver can arrive at the destination sooner by taking the second route instead of the first route. Conventional ETA determining systems are deficient in this manner, because they do not account for information specific to the particular driver.

Figure 9:
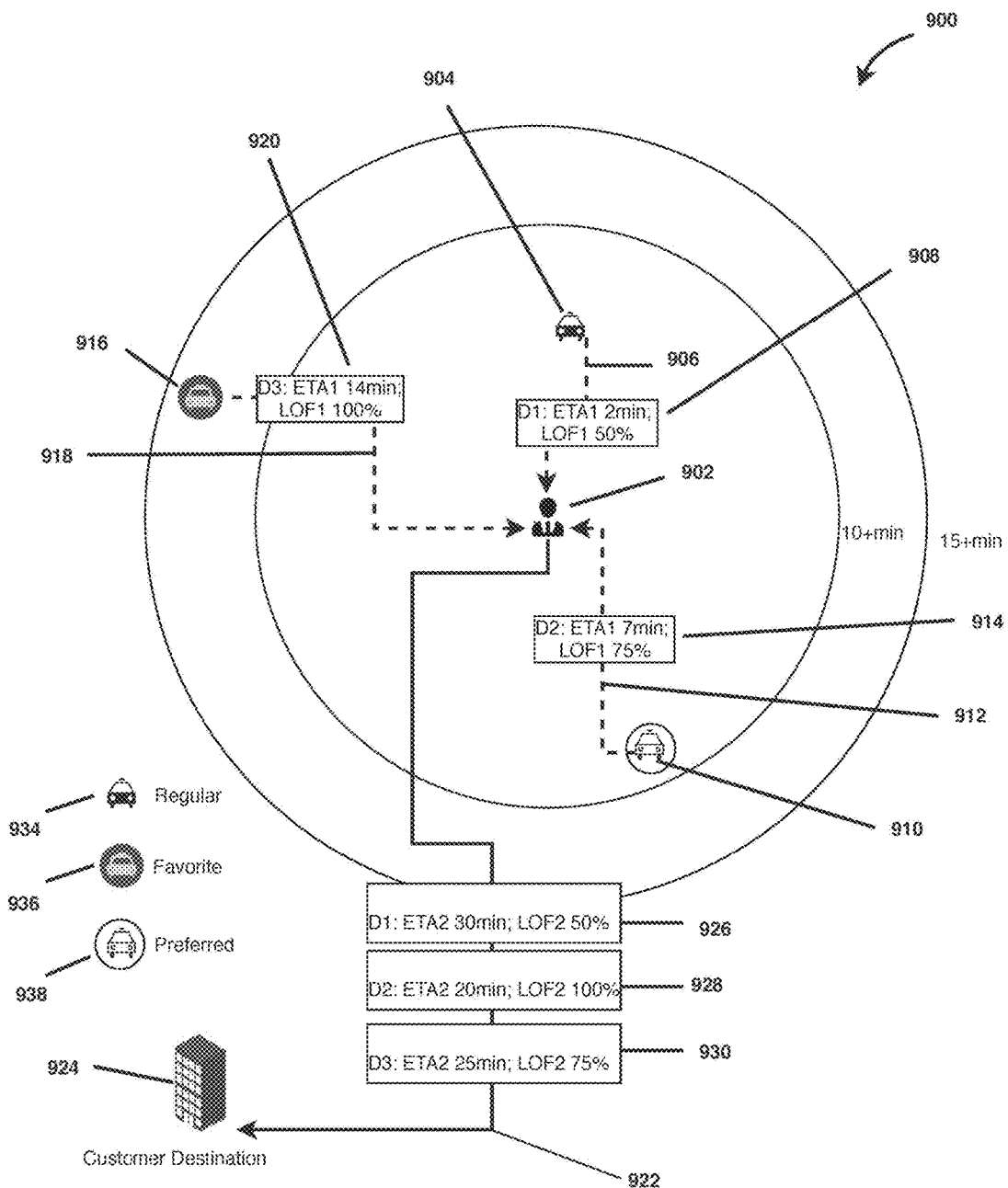
FIG. 9 depicts an exemplary representation of driver information, including ETA and LOF information, further showing each potential driver's ETA and LOF from their respective current locations to a customer pick-up location, as well as each potential driver's ETA and LOF for the route from the customer pick-up location to the customer's destination, in accordance with exemplary embodiments of the inventive disclosure.

With further reference to FIG. 9, depicted is an exemplary representation of driver information, further showing each driver's ETA and LOF from their respective current locations to the customer pick-up location, as well as each driver's ETA and LOF for the route from the customer pick-up location to the customer's destination. Representation 900 depicts a location of customer 902 at a center of the diagram, travel time ranges (i.e., a range of 10+ minutes and a range of 15+ minutes), and a plurality of available drivers D1 904, D2 910, and D3 916, identified by driver type (e.g., regular driver 904, 934, favorite driver 916, 936, preferred driver 910, 938, etc.). It will be appreciated that these may also be identified by other categories (i.e., vehicle type, etc.). It is important for customer 902 to be able to select a driver based on the driver's LOF from his/her current location to the customer's pick-up location, in addition to or alternative to the LOF from the customer location to the customer's intended destination. For example, too often a driver is unable to efficiently locate a customer at the pick-up location because the driver is not familiar enough with the route to the pick-up location even though the driver may have a very good LOF along a route from the customer's location to the customer's desired destination. In this scenario, the first LOF (i.e., to the pick-up location) may be significantly more important to the customer.

For example, as shown, customer 902 may place an on-demand trip request, and may preferably be depicted in the center of representation 900 with respect to a plurality of available drivers within the time travel ranges. The system may automatically and periodically track time-varying geographic locations of the drivers using time-varying geographic location information provided by location identifiers 124 of remote driver computing devices 104 or tracking devices in the vehicles (e.g., via separate GPS units, location identifiers in mobile phones, built into the vehicle, etc.). The time-varying geographic location information is stored and dynamically updated in database 110 so that the system may determine that regular driver 904 can reach customer 902 with an ETA of two (2) minutes and that the driver has an LOF of fifty percent (50%) along route 906 from his/her current location to customer 902, as shown by indicator 908. As shown, a second driver, D2 910, may be depicted using indicator 914 as preferred driver 910 having an ETA of seven (7) minutes and an LOF from his/her current location to customer 902 of seventy-five percent (75%) along route 912. Third, yet another driver, D3 916, may be displayed using indicator 920 as a favorite driver with an ETA of fourteen (14) minutes from his/her location to customer 902 and has an LOF of one hundred percent (100%) along route 918.

Similarly, ETA and LOF information may be displayed for each driver D1, D2 and D3 via indicators 926, 928 and 930, respectively, along the route from customer 902 (i.e., the pick-up location) to the destination location of customer 902. First, as depicted via indicator 926, driver D1 may have an ETA of thirty (30) minutes from the pick-up location to the customer's destination 924 based on an LOF of fifty percent (50%) along route 922. Second, as depicted via indicator 928, driver D2 may have an ETA of twenty (20) minutes from the pick-up location to the customer's destination 924 based on an LOF of one hundred percent (100%) along route 922. Third, as depicted via indicator 930, driver D3 may have an ETA of twenty-five (25) minutes from the pick-up location to the customer's destination 924 based on an LOF of seventy-five percent (75%) along route 922.

Therefore, if minimal time from request to arrival at customer destination 924 is of primary importance to customer 902, then he/she may opt for driver D2 since he/she has the shortest combined ETA of twenty-seven (27) minutes, whereas D1 has a combined ETA of thirty-two (32) minutes, and D3 has a combined ETA of thirty-nine (39) minutes. Of course, if customer 902 only cares about minimizing the time it will take to be picked-up, then he/she may opt for D1 having an ETA to pick-up of only two (2) minutes. In this manner, customer 902 may select the driver best suited for his/her needs. Alternatively, such driver and ETA information may be displayed to customer 902 in a list format.

It will be appreciated that in other embodiments, the information displayed for the customer may be simplified for ease of viewing and/or in accordance with the customer's preferences. For example, the total invidualized ETA for the driver to get to the pickup location and then to the drop off location (e.g., 32 minutes for D1) may be displayed, with or without the driver's level of familiarity. In other embodiments, the individualized ETA for the driver pertaining to only one of the two legs of the route may be displayed, with or without the driver's level of familiarity for the leg which is displayed.

It will also be appreciated that the pickup location may be different from the customer's present location. For example, the customer may be at a different location than where he/she desires to be picked up, and may specify a designated pick up location by inputting an address, cross-street, etc. In yet other embodiments, the systems and methods disclosed herein may be utilized in a prescheduling situation where, for example, a customer desires to preschedule a trip to an airport a day or a week in advance. In such embodiments, the system may be configured to display several drivers predicted to be available on the desired day at the desired time, along with their respective level of familiarity with the route from the customer's location or designated pick up location to the airport. In this manner, the customer can select a driver with a high level of familiarity in advance to ensure he will be picked up by a driver who will not get lost and potentially cause him to miss his flight.

In certain other exemplary embodiments, multiple terms may be used to refer to a customer who has an established positive relationship with a driver, such as a "favorite customer" (e.g., on a driver's "favorite list"). A driver who has an established positive relationship with a customer is referred to as a "favorite driver" (e.g., on a customer's "favorite list"). The term "favorite" as used herein is meant to be broadly construed and refers to anyone chosen to be prioritized in an assignment (e.g., on a "favorite list"). It will be understood by one skilled in the art that the concept of a "favorite" may alternatively be referenced as, for example, "friend," "top," "priority," or any other word used to define the concept of such list. In contrast to a "favorite list," a driver's "blacklist" or a customer's "blacklist" as used herein refers to a list that can prevent a future match between a driver and a customer (e.g., where both may be precluded from service request processing). It will be appreciated by one skilled in the art that other terms may be used to describe this concept, such as, for example, "block list," "ban list," "dislike list," or the like. A customer may similarly have a "preferred" driver, and a driver may have a "preferred" customer. The word "preferred" as used herein generally refers to a lower ranking than "favorite" for purposes of matching customers and drivers. Drivers and customers may further rank each other within these classifications. In certain embodiments, any driver who is not a favorite driver or a preferred driver of a customer is referred to herein as a "regular" driver. This term essentially means that the driver is not a preferred driver and has not been added to the favorite list. It will be understood that a particular status relating to a driver, be it "favorite," "preferred," or "regular," is always relative.

It is to be understood that the phraseology or terminology employed herein is for purposes of description and not of limitation. Having described preferred embodiments of the inventive disclosure with reference to the accompanying drawings, it is to be understood that such embodiments are merely exemplary, that the inventive disclosure is not limited to those precise embodiments, and that various changes, modifications, and adaptations may be affected therein by one skilled in the art without departing from the scope or spirit of the inventive disclosure as defined in the appended claims. For example, elements and/or features of different exemplary embodiments may be combined with each other and/or substituted for each other within the scope of this disclosure and appended claims. The scope of the inventive disclosure therefore shall be defined solely by the following claims.

What is claimed is:

1. A computer-implemented method for determining and providing an estimated time for arrival (ETA), the method comprising:

establishing, by a server, a current route of a first user to a destination location, the current route being based on a set of possible routes between a current geographic location of the first user and the destination location;

receiving, by the server, from a plurality of user computing devices, real-time time-location data associated with the first user and a first set of one or more other users along a first route segment of the current route, and from a second set of one or more other users along one or more additional route segments of the current route, wherein the real-time time-location data is periodically transmitted by at least one mobile data terminal in communication with the server through a wireless network;

identifying, by the server, based on the real-time time-location data, (i) a total distance between the current geographic location of the first user and the destination location, (ii) an average speed of the first user along the first route segment of the current route, (iii) an average speed of the first set of the one or more other users along the first route segment of the current route, and (iv) an average speed of the second set of the one or more other users along the one or more additional route segments of the current route;

determining, by the server, a difference between the average speed of the first user along the first route segment and the average speed of the first set of one or more other users along the first route segment;

computing, by the server, a predicted speed of the first user along the one or more additional route segments of the current route based on the difference and the average speed of the second set; and calculating, by the server, an ETA of the first user at the destination location based at least on the predicted speed of the first user along the one or more additional route segments of the current route, wherein the predicted speed of the first user along the one or more additional route segments is further computed by (a) identifying and updating the real-time time-location data of the first user, and (b) determining one or more characteristics in accordance with one or more predetermined rules, wherein the one or more characteristics comprise at least a level of familiarity (LOF) of the first user with one or more segments of the current route; and displaying, by the server, on at least one of a display screen of a first user computing device associated with the first user or a second user computing device associated with a second user, at least a portion of data related to the ETA of the first user and additional data related to the LOF of the first user.

2. The method according to claim 1, wherein the one or more characteristics further comprise at least one of:
   i. a geometry of the one or more segments;
   ii. whether the current route is a double-back of a route previously completed by the user within a predetermined time period;
   iii. a type of vehicle driven by the first user;
   iv. one or more bottlenecks along the one or more segments of the route;
   v. an age range of the first user;
   vi. a gender of the first user;
   vii. road and weather conditions along the one or more segments;
   viii. one or more speed limits along the one or more route segments;
   ix. a time frame of the first user travelling along the one or more segments; or
   x. a retrieved portion of the historic data associated with the first user.

3. The method according to claim 2, further comprising:
   displaying, on a graphical user interface of the display screen of the second user computing device, an indicator representing the LOF of the first user with one or more segments of the current route,
   wherein the LOF of the first user with the one or more segments of the current route is calculated in terms of a percent, percent intervals, or tiers, and is determined, in accordance with one or more predetermined rules, from a combination of recency, frequency, and consecutiveness of the first user completing the one or more segments; and
   wherein identification of the current route as being the double-back of the route previously completed by the first user within a predetermined time period is assigned a coefficient, in accordance with the one or more predetermined rules, and factored into the LOF calculation.

4. The method according to claim 1, wherein the LOF is determined based on:
   (i) a comparison of a set of historical global positioning system (GPS) location data of the first user with a set of GPS location data for the first route segment and the one or more additional route segments of the current route of the first user;
   (ii) a determination of a matching relationship between the set of historical GPS location data of the first user and a set of GPS location data for the first route segment and the one or more additional route segments of the current route of the first user, wherein the matching relationship is defined as a percentage of the set of GPS location data for the first route segment and the one or more additional route segments of the current route of the first user that matches directly or indirectly the set of historical GPS location data; and
   (iii) identification of a recency, frequency, and consecutiveness of travel along each of the first route segment and the one or more additional route segments by the first user, wherein recency is defined as a degree of separation between travelling along one or more segments comprising the current route and a most recent instance of travelling along the one or more segments, wherein the frequency is defined as a number of times travelling along the one or more segments, and the consecutiveness is defined as a degree of separation between one or more instances of travelling along the one or more segments of the current route.

5. The method according to claim 1, further comprising:
   establishing one or more route segments of the current route of the first user to the destination location;
   calculating, based on first user historical data stored in a database, an estimated average speed of the first user along one or more previous route segments that overlap the one or more route segments of the current route;
   determining an adjustment to the average speed of the first user along the current route based on the estimated average speed; and
   modifying the ETA of the first user at the destination location based on the adjustment, wherein the destination location is a pick-up location.

6. The method according to claim 1, further comprising:
   collecting and storing one or more speed limits corresponding to one or more segments of the current route;
   calculating an average speed difference between the average speed of the first user along the one or more route segments and the one or more speed limits along the one or more route segments, and
   modifying the ETA of the first user at the destination location based on the average speed difference.

7. The method according to claim 1, further comprising:
   monitoring a speed of a vehicle driven by the first user; and
   varying a frequency with which real-time time-location data generated by first user computing device associated with the first user is received and stored in a database,
   wherein the frequency is varied, in accordance with a plurality of predetermined rules, based on a speed of a vehicle driven by the first user, and
   wherein the real-time time-location data generated by the first user computing device is received less frequently if the speed of the vehicle driven by the first user exceeds a predetermined threshold.

8. The method according to claim 1, wherein the current route of the first user to the destination location comprises:
   (i) a first route defined from the current geographic location of the first user to a pick-up location of a customer; or (ii) a second route defined from the pick-up location of the customer to a drop-off location of the customer,
   and wherein the additional data displayed comprises an indicator representative of the LOF of the first user.

9. A computer-implemented method for determining and providing an estimated time for arrival (ETA), the method comprising:
   identifying, by a server, a preferred route of a first user to a destination location between a current geographic location of the first user and the destination location;
   setting, by the server, the preferred route as a current route of the first user;
   receiving, by the server, from a plurality of user computing devices, real-time time-location data associated with the first user and a first set of one or more other users along a first route segment of the current route, and from a second set of one or more other users along one or more additional route segments of the current route, wherein the real-time time-location data is periodically transmitted by at least one mobile data terminal in communication with the server through a wireless network;

identifying, by the server, based on the real-time time-location data, a total distance between the current geographic location of the first user and the destination location;

determining, based on the real-time time-location data, (i) an average speed of the first user along the first route segment of the current route, wherein the average speed is based on one of: an actual average speed of the first user or a historical average speed of the first user along the first route segment, (ii) an average speed of the first set of one or more other users along the first route segment of the current route, and (iii) an average speed of the second set of one or more other users along the one or more additional route segments of the current route; and computing the ETA for the first user by calculating a predicted speed of the first user along the one or more additional route segments of the current route, wherein the predicted speed of the first user is computed at least by (a) identifying the real-time time-location data of the first user, and (b) determining one or more characteristics in accordance with one or more predetermined rules, wherein the one or more characteristics comprise determining:

a difference in average speed between the average speed of the first user along the first route segment and the average speed of the second set of one or more other users along the one or more additional route segments; and a level of familiarity (LOF) of the first user with the current route; and displaying, by the server, on a display screen of a second computing device associated with a second user, a portion of data related to the ETA of the first user, and additional data related to the LOF of the first user.

10. The method according to claim 9, wherein the predicted speed of the first user along the one or more additional route segments is further computed by determining at least one of:

a LOF of each of one or more segments of the current route, wherein the LOF is calculated in terms of a percent, percent intervals, or tiers, and is determined, in accordance with one or more predetermined rules, as a combination of recency, frequency, and consecutiveness of the first user completing the one or more segments;

a geometry of the one or more segments, wherein the geometry of the one or more segments of the current route is determined in terms of a total interval or a tier of degrees of a road curvature of the one or more segments, wherein the road curvature of the one or more segments is assigned a coefficient, in accordance with one or more predetermined rules, and factored into a calculation of the predicted speed;

whether the current route is a double-back of a route previously completed by the first user within a predetermined time period, wherein identification of the current route as being the double-back of the route previously completed by the first user within the predetermined time period is assigned a coefficient, in accordance with the one or more predetermined rules, and factored into the calculation of the predicted speed;

a type of vehicle driven by the first user, wherein the type of vehicle driven by the first user along the current route is assigned a coefficient factored into the calculation of the predicted speed, wherein the coefficient, in accordance with one or more predetermined rules, depends on a tier of size of the vehicle;

one or more bottlenecks along the one or more segments of the route, wherein the one or more bottlenecks are assigned a coefficient based on a magnitude of lane merger along the one or more segments of the current route, wherein the coefficient is factored into calculation of the predicted speed;

an age range of the first user, wherein an individual driving behavior of the first user with respect to the age range of the first user is factored into the calculation of the predicted speed of the first user based on an assigned age coefficient;

a gender of the first user, wherein an individual driving behavior of the first user with respect to the gender of the first user is factored into the calculation of the predicted speed of the first user based on an assigned gender coefficient;

road and weather conditions along the one or more segments, wherein an individual driving behavior of the first user with respect to the road and weather conditions is factored into the calculation of the predicted speed of the first user based on an assigned conditions coefficient;

one or more speed limits along the one or more route segments, wherein an individual driving behavior of the first user with respect to the one or more speed limits is factored into the calculation of the predicted speed of the first user based on an assigned speed limit coefficient; or a time frame during which the first user is travelling along the one or more segments, wherein an individual driving behavior of the first user with respect to the time frame is factored into the calculation of the predicted speed of the first user based on an assigned time frame coefficient.

11. The method according to claim 9, wherein the preferred route of the first user to the destination location comprises:

(i) a first route selected by the first user and defined from the current geographic location of the first user to a pick-up location of a customer; or (ii) a second route selected by the first user or the customer and defined from the pick-up location of the customer to a drop-off location of the customer.

12. The method according to claim 9, wherein the LOF is determined based on:

(i) a comparison of a set of historical global positioning system (GPS) location data of the first user with a set of GPS location data for the first route segment and the one or more additional route segments of the current route of the first user; and (ii) a determination of a matching relationship between the set of historical GPS location data of the first user and a set of GPS location data for the first route segment and the one or more additional route segments of the current route of the first user, wherein the matching relationship is defined as a percentage of the set of GPS location data for the first route segment and the one or more additional route segments of the current route of the first user that matches directly or indirectly the set of historical GPS location data.

13. The method according to claim 9, further comprising:
detecting a new current route of the driver first user based on a change in course from the current route; and
adjusting the ETA, the adjusting comprising:

determining the difference in average speed between the average speed of the first user and the average speed of the one or more other users along the new current route;

calculating a new predicted speed of the first user for one or more segments of the new current route, wherein the new predicted speed of the first user is computed at least by identifying the real-time time-location data of the first user and by determining and assigning weights to the one or more characteristics.

14. The method according to claim 9, wherein the additional data displayed comprises an indicator representative of the LOF of the first user.

15. The method according to claim 9, further comprising:
identifying one or more alternative routes from the current geographic location of the first user to the destination location;

calculating (i) a travel time estimate for each of the one or more alternative routes, (ii) a travel distance for each of the one or more alternative routes, and, (iii) a travel cost for each of the one or more alternative routes; and establishing a preferred route by selecting one of the one or more alternative routes based on the travel time, the travel distance and the travel time estimate.

16. The method according to claim 9, further comprising:
determining at least one change to the one or more segments of the current route, wherein the at least one change comprises (a) a re-routing of at least one of the one or more segments of the current route; (b) a change to the ETA beyond at least one threshold criterion; or (c) a combination thereof;

updating the ETA based on the at least one change; and
generating a notice based on a change to the ETA.

17. A computer-implemented method for determining and providing an estimated time for arrival (ETA), the method comprising:
establishing, by a server, a current route of a first user to a destination location, the current route being based on a set of possible routes between a current geographic location of the first user and the destination location;

receiving, by the server, real-time time-location data from a first computing device associated with the first user, wherein the real-time time-location data is periodically transmitted by at least one mobile data terminal in communication with the server through a wireless network;

determining, by the server, based on the real-time time-location data, an ETA of the first user at the destination location, wherein the ETA determination is individualized for the first user based at least on a level of familiarity (LOF) of the first user with the current route, the current route comprising one or more segments;

displaying, on a display screen, an interactive electronic interface including a portion of data relating to the LOF of the first user with the current route, wherein the LOF is represented as at least one of: (a) a direct LOF or (b) an indirect LOF; and displaying, on the interface, a roadmap of the current route and one or more depictions of one or more alternative routes from the current geographic location of the first user to the destination location, wherein the one or more depictions of the one or more alternative routes are displayed with respective data identifying a disparity between the current route and the one or more alternative routes, and a corresponding LOF for at least a respective portion of each route.

18. The method according to claim 17, wherein the portion of data relating to the LOF of the first user comprises an indicator representative of the LOF of the first user with the current route.

19. The method according to claim 17, further comprising:
displaying, on a display screen of the first computing device or a second computing device associated with a second user, the current route of the first user to the destination location, the current route comprising:
(i) a first route selected by the first user and defined from the current geographic location of the first user to a pick-up location of a customer; or
(ii) a second route selected by the first user or the customer and defined from the pick-up location of the customer to a drop-off location of the customer;

displaying, on the display screen of the second computing device associated with the second user, the interactive electronic interface including the portion of data relating to the LOF of the first user with at least one of: the first route, the second route, or a combination thereof; and displaying, on at least one of the first computing device or the second computing device, the ETA of the first user at the destination location, wherein the ETA comprises data for the first route, the second route, or a combination thereof.

20. The method according to claim 19, wherein the first user is a driver and the second user is the customer at the pick-up location, or a passenger riding in a same vehicle as the first user.

* * * * *